(12) United States Patent
Diemoz et al.

(10) Patent No.: US 12,435,096 B2
(45) Date of Patent: Oct. 7, 2025

(54) INDIUM PRECURSORS FOR VAPOR DEPOSITIONS

(71) Applicant: American Air Liquide, Inc., Fremont, CA (US)

(72) Inventors: Kayla Diemoz, Wilmington, DE (US); Bradley McKeown, Wilmington, DE (US); Claudia Fafard, Newark, DE (US); Venkateswara R. Pallem, Hockessin, DE (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 18/217,963

(22) Filed: Jul. 3, 2023

(65) Prior Publication Data
US 2023/0357281 A1    Nov. 9, 2023

Related U.S. Application Data

(62) Division of application No. 17/063,768, filed on Oct. 6, 2020, now abandoned.

(51) Int. Cl.
*C07F 5/00* (2006.01)
*C23C 16/18* (2006.01)
(Continued)

(52) U.S. Cl.
CPC .............. *C07F 5/003* (2013.01); *C23C 16/18* (2013.01); *C23C 16/407* (2013.01); *C23C 16/45553* (2013.01)

(58) Field of Classification Search
CPC . C07F 5/003; C23C 16/407; C23C 16/45553; C23C 16/18; C23C 16/30; C23C 16/45531
See application file for complete search history.

(56) References Cited

U.S. PATENT DOCUMENTS

2002/0098973 A1    7/2002   Campbell et al.
2005/0277223 A1*  12/2005   Lee ................... H01L 21/02274
                                                          556/51
(Continued)

FOREIGN PATENT DOCUMENTS

JP        2010 514918       5/2010
JP        2016 500674       1/2016
(Continued)

OTHER PUBLICATIONS

Dehnicke, K. et al., N,N,N'-tris(trimethylsilyl)organoamidine als Reagentien in der Komplexchemie, Journal of Organometallic Chemistry, 352 (1988), C1-C4 & English translation.
(Continued)

*Primary Examiner* — Michael G Miller
(74) *Attorney, Agent, or Firm* — Yan Jiang

(57) ABSTRACT

Disclosed are indium (In)-containing film forming compositions comprising In(III)-containing precursors that contain halogens, methods of synthesizing them and methods of using them to deposit the indium-containing films and/or indium-containing alloy film. The disclosed In(III)-containing precursors contain chlorine with nitrogen based ligands. In particular, the disclosed In(III)-containing precursors contains 1 or 2 amidinate ligands, 1 or 2 iminopyrrolidinate ligands, 1 or 2 amido amino alkane ligands, 1 or 2 μ-diketiminate ligands or a silyl amine ligand. The disclosed In(III)-containing precursors are suitable for vapor phase depositions (e.g., ALD, CVD) of the indium-containing films and/or indium-containing alloy films.

11 Claims, 13 Drawing Sheets

(51) Int. Cl.
  *C23C 16/40* (2006.01)
  *C23C 16/455* (2006.01)

(56) References Cited

U.S. PATENT DOCUMENTS

| | | | |
|---|---|---|---|
| 2009/0023940 A1* | 1/2009 | Lipiecki | C23C 16/18 556/27 |
| 2009/0305458 A1 | 12/2009 | Hunks et al. | |
| 2013/0273250 A1 | 10/2013 | Fujimura et al. | |
| 2015/0270500 A1 | 9/2015 | Stoessel et al. | |
| 2016/0017485 A1 | 1/2016 | Martinson et al. | |
| 2016/0326008 A1 | 11/2016 | Koh et al. | |
| 2017/0137360 A1 | 5/2017 | Curley et al. | |
| 2018/0230592 A1 | 8/2018 | Winter | |

FOREIGN PATENT DOCUMENTS

| | | |
|---|---|---|
| KR | 10 1221861 | 1/2013 |
| KR | 2020 0041237 A | 4/2020 |

OTHER PUBLICATIONS

Gebhard, M. et al., Indium-tris-guanidinates: a promising class of precursors for water assisted atomic layer deposition of $In_2O_3$ thin films, Dalton Transactions, The Royal Society of Chemistry, 2014, 43, 937-940.

Gebhard, M. et al., New amidinate complexes of indium(III): promising CVD precursors for transparent and conductive $In_2O_3$ thin films, Dalton Transactions, The Royal Society of Chemistry, 2013, 00, 1-3.

Hwang, H.L. et al., Growth and process identification of $CuInS_2$ on GaP by chemical vapor deposition, J. Cryst. Growth, 1981, vol. 55, Iss. 1, 116-124.

Kim, H.Y. et al., Low-temperature growth of indium oxide thin film by plasma-enhanced atomic layer deposition using liquid dimethyl(N-ethoxy-2,2-dimethylpropanamido)indium for high-mobility thin film transistor application, ACS Appl. Mater. Interfaces 2016, 8, 26924-26931.

Kim, S.B. et al., Obtaining a low and wide atomic layer deposition window (150-275° C.) for $In_2O_3$ films using an $In^{III}$ amidinate and $H_2O$, Chem. Eur. J. 2018, 24, 9525-9529.

Kottmatr-Maieron, D. et al., Monomeric dialkylmetal complexes of the type R2M (NR ') 2XR with M=Al, Ga, In, Ti; X-S, C and R, R '=alkyl and silyl, Z. Anorg. Allg. Chem. 593 (1991), 111-123—English translation.

McCarthy, R.F. et al., Oxygen-free atomic layer deposition of indium sulfide, ACS Appl. Mater. Interfaces 2014, 6, 12137-12145.

Patton, J.T. et al., Indium-bridged chelating diamide Group IV metal olefin polymerization catalysts, Organometallics 2002, 21, 2145-2148.

Seki, S. et al., Indium-tin-oxide thin films prepared by dip-coating of indium diacetate monohydroxide and tin dichloride, Thin Solid Films 388 (2001), 22-26.

International Search Report and Written Opinion for corresponding PCT/US2021/053714, Dec. 7, 2021.

Barry, S.T. et al., Chemical vapour deposition of $In_2O_3$ thin films from a tris-guanidinate indium precursor, Dalton Trans., 2011, 40, 9425-9430.

* cited by examiner

INDIUM PRECURSORS FOR VAPOR DEPOSITIONS

CROSS REFERENCE TO RELATED APPLICATIONS

The present application is a divisional application of U.S. application Ser. No. 17/063,768 filed Oct. 6, 2020, which is being incorporated by reference herein in its entirety for all purposes.

TECHNICAL FIELD

The present invention relates to indium (III)-containing film forming compositions comprising In(III)-containing precursors that contain halogens, methods of synthesizing them and methods of using them to deposit the indium-containing films and/or indium-containing alloy films, in particular, to the In(III)-containing precursors containing chlorine with nitrogen based ligands suitable for vapor phase depositions (e.g., ALD, CVD) of the indium-containing films and/or indium-containing alloy films.

BACKGROUND

Indium-containing alloys, thin films, and nanostructured materials are highly versatile optoelectronic materials widely applied in both research and industry, in particular the semiconductor industry, with applications in many areas including electronics and photonics. For example, InGaAs is believed to be one of the stronger contenders for the future replacement of silicon in CMOS systems. InGaAs is also a key component of optical fiber telecommunications, serving as a high-speed, high sensitivity photodetector. Despite the impressive physical properties of indium alloys and, indeed, all group III-V alloys, these materials are hamstrung by two key challenges. The synthesis of these materials is either limited to slow growth processes, such as molecular beam epitaxy, or by metalorganic chemical vapor deposition, which requires enormous amounts of material and challenging engineering to achieve throughput, uniformity, and reproducibility. The next challenge relates specifically to the semiconductor industry. Combining group III-V semiconductors with silicon is extremely challenging and has prevented the rapid development of high-performance devices. The development of new precursors for group III-V alloys, including indium, which are compatible with high-throughput production and ease of device integration is highly desirable to multiple industries.

Homoleptic indium precursors have been investigated for deposition processes. For example, Kim et al. ("Obtaining a Low and Wide Atomic Layer Deposition Window (150-275° C.) for $In_2O_3$ Films Using an $In^{III}$ Amidinate and $H_2O$", Chem. Eur. J. 2018, 24, 9525) disclose two new In complexes for ALD of $In_2O_3$ including tris(N,N'-diisopropylformamidinato)indium(III). Results are compared to homoleptic alkyl and aryl indium complexes, $(CH_3CH_2)_3In$, $(CH_3)_3In$, and CpIn (Cp=cyclopentadienyl).

US 20130273250 to Fujimura et al. discloses (Amide Amino Alkane) metal compounds and a method of manufacturing metal-containing thin films using said metal compounds, in which a series of novel homoleptic amide amino alkane metal complexes are used for chemical vapor deposition (CVD). The disclosed metal complexes include lithium, sodium, magnesium, manganese, iron, cobalt, nickel, zinc, yttrium, lanthanum, and indium complexes. Specific examples include

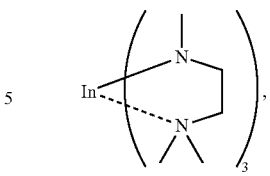

which was isolated as a semi-solid wax that distilled under reduced pressure (130° C., 13.3 Pa).

Gebhard et al. discloses ("Indium-tris-guanidinates: A Promising Class of Precursors for Water Assisted Atomic Layer Deposition of $In_2O_3$ Films," Dalton Trans, 2014, 43, 937) syntheses of two homoleptic indium-tris-guanidinate complexes. The compounds were isolated as solids and used for indium oxide ALD processes.

McCarthy et al. ("Oxygen-Free Atomic Layer Deposition of Indium Sulfide", ACS Appl. Mater. Interfaces 2014, 6,12137) discloses indium (III) amidinate complexes used for ALD of indium sulfide using hydrogen sulfide.

Heteroleptic indium precursors have been investigated for deposition processes. Examples of heteroleptic indium (III) precursors included alkyl ligands, acetate and hydroxyl ligands. For example, Low-temperature growth of indium oxide thin film by plasma-enhance ALD using liquid dimethyl(N-ethoxy-2,2-dimethylpropanamido)indium for high-mobility thin film transistor application. Kim et al., ACS Appl. Mater. Interfaces 2016, 8, 40, 26924.

US 2016017485 to Martinson et al. discloses a method of atomic layer deposition of indium sulfide films using a synthesized indium precursor and hydrogen sulfide. US 20160326008 to Koh et al. discloses details heteroleptic Indium (III) precursors bis(trimethylsilyl)aminodiethylindium and dimethyl(3-dimethylaminopropyl)indium which are liquids at room temperature.

Gebhard et al. (New amidinate complexes of indium(III): Promising CVD precursors for transparent and conductive $In_2O_3$ thin films, Dalton Trans., 2013, 00, 1-3) disclose details the synthesis of two new heteroleptic indium precursors: [InCl(amd)$_2$] and [InMe(amd)$_2$]. However the chlorine-containing precursor was only synthesized and not used for deposition or investigated for its thermal properties.

WO 2017083483 (US 20170137360) to Curley et al. discloses details the synthesis of dicarboxylate monohydroxyl indium precursors. Several examples of this precursor being used for the solution phase synthesis of InP nanostructures are provided.

Seki et al. (Indium tin oxide thin films prepared by dip-coating of indium diacetate monohydroxide and tin dichloride, Thin Solid Films, 2001, 388, 22-26) discloses tin-doped $In_2O_3$ (ITO) films were prepared by the dip-coating method using an ethanol solution of indium diacetate monohydroxide, $In(OH)(CH_3COO)_2$, and tin dichloride, $SnCl_2·2H_2O$, with 2-aminoethanol (monoethanolamine), $H_2NC_2H_4OH$.

Patton et al. (Chelating Diamide Group IV Metal Olefin Polymerization. Organometallics, 2002, 21, 10, 2145) discloses dichloroindium-tert-Butyl-N,N'-diisopropylamidinate was synthesized as an intermediate en route to indium-bridged chelating diamide titanium complex used as a catalyst for olefin polymerization. The indium amidinate compound was isolated cleanly in 48% yield and characterized using $^1H$, $^{13}C$ NMR spectroscopy and HRMS.

WO 0146201A1 (US 20020098973A1) to Campbell et al. discloses a large range of bridged Group 4 transition metal complexes are disclosed. For those bridged group 4 transition metal complexes that contain indium, dichloroindium-tert-butyl-N,N'-diisopropylamidinate is synthesized as an intermediate.

Debnicke et al. (N,N,N'-tris(trimethylsilyl) as reagents in complex chemistry, J. Organomet. Chem, 1988, 352, (1-2), C1) disclose dichloroindium-phenyl-N,N'-Bis(trimethylsilyl)amidinate was synthesized as during a screen of the reaction of N,N,N'-tris(trimethylsilyl) organoamidines with main group and transition metal halides. Isolation or characterization of the indium complex was not reported.

Kottmair-Maieron et al. (Monomeric dialkyl metal complexes of $R_2M(NR')_2XR$ type with M=aluminum, gallium, indium, thallium; x=sulfur, carbon and R, R'=alkyl and silyl, Z. Anorg. Allg. Chem, 1991, 593, 111) disclose a series of group III compounds using the amidinate scaffold were reported. The synthesis of dichloroindium-methyl-N,N'-diisopropylamidinate was reported as a low melting solid and characterized by NMR and IR spectroscopy; no further applications of molecules were reported.

Hwang et al. (J. Cryst. Growth, 1981, vol. 55, Iss. 1, 116-124) disclose that indium trichloride acetonitrile adduct, $InCl_3(NCCH_3)$, combined with $CuCl(NCCH_3)_n$ as the copper source (both dissolved in acetonitrile solvent, $NCCH_3$), and hydrogen sulfide $H_2S$, as the sulfur source, was applied as precursor for the growth of $CuInS_2$ layers on GaP substrates by MOCVD. The precursor vapor generated by bubbling $N_2$ through the sources dissolved in acetonitrile.

SUMMARY

Disclosed is a method for forming an indium(III)-containing film on a substrate, the method comprising the steps of:
- exposing the substrate to a vapor of a film forming composition that contains an indium(III)-containing precursor, and
- depositing at least part of the indium(III)-containing precursor onto the substrate to form the indium(III)-containing film on the substrate through a vapor deposition process,
- wherein the indium(III)-containing precursor has the formula:

$[(R^1)N\text{===}C(R^3)\text{===}N(R_2)]InX_2$, $[(R^1)N\text{===}C(R^3)\text{===}N(R^2)]_2InX$, or $[((R^1)N\text{===}C(R^3)\text{===}N(R_2))InX]_2(\mu\text{-}X)_2$, (a)

wherein X is chosen from chlorine, bromine and iodine, preferably chlorine; $R^1$ and $R^2$ are each independently selected from a linear, branched or cyclic $C_1$ to $C_9$ alkyl, vinyl or aryl groups or —$SiR^4R^5R^6$ wherein $R^4$, $R^5$, $R^6$ are each independently selected from a linear, branched or cyclic $C_1$ to $C_9$ alkyl, vinyl or aryl groups; $R^3$ is selected from H or a linear, branched or cyclic $C_1$ to $C_9$ alkyl, vinyl or aryl group or —$NR^7R^8$ where $R^7$ and $R^8$ are each independently selected from H or a linear, branched or cyclic $C_1$ to $C_9$ alkyl, vinyl or aryl groups. Under certain conditions when the disclosed In(III)-containing precursors have sufficiently small $R^1$, $R^2$ and $R^3$, the structure may exist as the dimeric structure $[(R^1)N\text{===}C(R^3)\text{===}N(R^2))InX]_2(\mu\text{—}X)_2$,

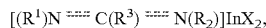
$[((R^2R^3)C)N\text{==}C(CR^6R^7CR^4R^5)\text{—}N(R^1)]InX_2$,

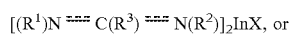
$[((R^2R^3)C)N\text{==}C(CR^6R^7CR^4R^5)\text{—}N(R^1)]_2InX$, or

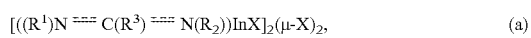
$[(((R^2R^3)C)N\text{==}C(CR^6R^7CR^4R^5)\text{—}N(R^1))InX]_2(\mu\text{-}X)_2$, where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups: $R^1$, $R^2$, $R^3$, $R^4$, $R^5$, $R^6$ and $R^7$ may also be —$SiR^8R^9R^{10}$ where $R^6$, $R^9$, $R^{10}$ are each independently selected from a linear, branched or cyclic $C_1$ to $C_9$ alkyl, vinyl or aryl group. Under certain conditions when the disclosed In(III)-containing precursors have sufficiently small $R^1$, $R^2$ and $R^3$, the structure may exist as the dimeric structure

$[(((R^2R^3)C)N\text{==}C(CR^6R^7CR^4R^5)\text{—}N(R^1))InX]_2(\mu\text{-}X)_2$,

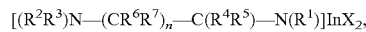
$[(R^2R^3)N\text{—}(CR^6R^7)_n\text{—}C(R^4R^5)\text{—}N(R^1)]InX_2$,

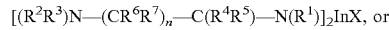
$[(R^2R^3)N\text{—}(CR^6R^7)_n\text{—}C(R^4R^5)\text{—}N(R^1)]_2InX$, or

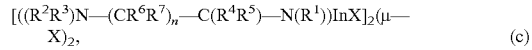
$[((R^2R^3)N\text{—}(CR^6R^7)_n\text{—}C(R^4R^5)\text{—}N(R^1))InX]_2(\mu\text{—}X)_2$, (c)

where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups; $R^1$, $R^2$, $R^3$, $R^4$, $R^5$, $R^6$ and $R^7$ may also be —$SiR^8R^9R^{10}$ where $R^8$, $R^9$, $R^{10}$ are each independently selected from a linear, branched or cyclic $C_1$ to $C_9$ alkyl, vinyl or aryl group. For these In(III) containing precursors, n=1 or 2 will provide either a 5-membered or 6-membered metallacycle, respectively. Groups $R^6$ and $R^7$ on each C are not required to be identical for structures where n=2. Under certain conditions when the disclosed In(III)-containing precursors have sufficiently small $R^1$, $R^2$ and $R^3$ and n=1, the structure may exist as the dimeric structure $[((R^2R^3)N\text{—}(CR^6R^7)_n\text{—}C(R^4R^5)\text{—}N(R^1))InX]_2(\mu\text{—}X)_2$.

$[(R^1)N\text{===}(R^3)\text{===}C(R^4)\text{===}C(R^5)\text{===}N(R^2)]InX_2$, or $[(R^1)N\text{===}C(R^3)\text{===}C(R^4)\text{===}C(R^5)\text{===}N(R^2)]_2InX$, (d)

where X is a halogen, preferably chlorine. $R^1$, $R^2$, $R^3$, $R^4$ and $R^5$ are each independently selected from a linear, branched or cyclic $C_1$ to $C_9$ alkyl, vinyl or aryl groups; $R^1$, $R^2$, $R^3$, $R^4$ and $R^5$ may also be —$SiR^6R^7R^8$ where $R^6$, $R^7$, $R^8$ are each independently selected from a linear, branched or cyclic $C_1$ to $C_9$ alkyl, vinyl or aryl group. Groups $R^1$, $R^2$, $R^3$ and $R^5$ may also be selected from fluorinated linear or aromatic groups (e.g., $CF_3$, m-$(CF_3)_2$—$C_6H_3$, etc.). Group $R^4$ may also be selected from halogens, such as F, and $[N((SiR^1R^2R^3)R^4)]InX_2$ (e)

where X is chosen from chlorine, bromine and iodine, preferably chlorine; $R^1$, $R^2$, and $R^3$ are each independently selected from hydrogen or a linear, branched or cyclic $C_1$ to $C_9$ alkyl, vinyl or aryl groups, $R^4$ is hydrogen or a linear, branched or cyclic $C_1$ to $C_9$ alkyl, vinyl or aryl group or a —$SiR^5R^6R^7$ group wherein $R^5$, $R^6$, and $R^7$ are each independently selected from hydrogen or a linear, branched or cyclic $C_1$ to $C_8$ alkyl, vinyl or aryl group.

The disclosed methods may include one or more of the following aspects:
- X being chloride;
- the indium(III)-containing precursor being [(Et)N ≡ C(Me) ≡ N(tBu)]In(III)Cl$_2$;
- the indium(III)-containing precursor being [(iPr)N ≡ CH ≡ N(iPr)]In(III)Cl$_2$ or [((iPr)N ≡ C(H) ≡ N(iPr))InCl]$_2$(μ—Cl)$_2$;
- the indium(III)-containing precursor being [(Et)N ≡ C(nBu) ≡ N(tBu)]In(III)Cl$_2$;
- the indium(III)-containing precursor being [(iPr)N ≡ C(nBu) ≡ N(iPr)]In(III)Cl$_2$;
- the indium(III)-containing film being an indium oxide film, or a binary, ternary and quaternary indium alloy film;
- the indium(III)-containing film being a layer of, but not limited to, InGaAs, In$_x$O$_y$ (x=0.5 to 1.5, y=0.5 to 1.5), InSnO (ITO), InGaZnO (IGZO), InN, InP, InAs, InSb, In$_2$S$_3$, or In(OH)$_3$;
- the indium(III)-containing film being a pure indium (In(0)) layer;
- the Indium-containing film containing a second element selected from P, N, S, Ga, As, B, Ta, Hf, Nb, Mg, Al, Sr, Y, Ba, Ca, As, Sb, Bi, Sn, Pb, Co, Zn, one or more lanthanides, or combinations thereof;
- the vapor deposition process being a ALD process, a CVD process or a combination thereof;
- the vapor deposition process being a PEALD process or a spatial ALD process;
- further comprising the step of exposing the substrate to a co-reactant;
- the co-reactant being selected from O$_3$, O$_2$, H$_2$O, NO, N$_2$O, NO$_2$, H$_2$O$_2$, O radicals and combinations thereof;
- the co-reactant being O$_3$ or O$_2$;
- the co-reactant being selected from NH$_3$, NO, N$_2$O, hydrazines, N$_2$ plasma, N$_2$/H$_2$ plasma, NH$_3$ plasma, amines and combinations thereof;
- the co-reactant being NH$_3$;
- the co-reactant being N$_2$ plasma;
- the co-reactant being treated by a plasma;
- the substrate being a powder;
- the powder comprising one or more of NMC (Lithium Nickel Manganese Cobalt Oxide), LCO (Lithium Cobalt Oxide), LFP (Lithium Iron Phosphate), and other battery cathode materials;
- the deposition pressure being held between about $10^{-3}$ Torr and about 100 Torr;
- the deposition pressure being held between about $10^{-2}$ Torr and 100 Torr;
- the deposition temperature being held between about 100° C. and about 600° C.;
- the deposition temperature being held between about 150° C. and about 500°; and
- the deposition reactor wall being heated from approximately 50° C. to approximately 600° C.

Also disclosed is a method for forming an indium(III)-containing film on a substrate, the method comprising the steps of:
forming a chemisorbed and/or physisorbed film, on the surface of the substrate, of an indium(III)-containing precursor having the formula:

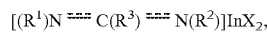

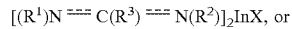

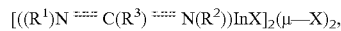 (a)

wherein X is chosen from chlorine, bromine an iodine, preferably chlorine; $R^1$ and $R^2$ are each independently selected from a linear, branched or cyclic $C_1$ to $C_9$ alkyl, vinyl or aryl groups or —SiR$^4$R$^5$R$^6$ wherein $R^4$, $R^5$, $R^6$ are each independently selected from a linear, branched or cyclic $C_1$ to $C_9$ alkyl, vinyl or aryl groups; $R^3$ is selected from H or a linear, branched or cyclic $C_1$ to $C_9$ alkyl, vinyl or aryl group or —NR$^7$R$^8$ where $R^7$ and $R^8$ are each independently selected from H or a linear, branched or cyclic $C_1$ to $C_9$ alkyl, vinyl or aryl groups. Under certain conditions when the disclosed In(III)-containing precursors have sufficiently small $R^1$, $R^2$ and $R^3$, the structure may exist as the dimeric structure [((R$^1$)N ≡ C(R$^3$) ≡ N(R$^2$))InX]$_2$(μ—X)$_2$.

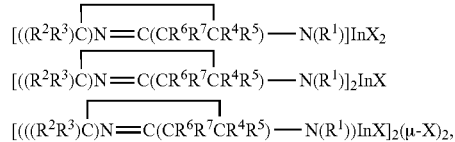 (b)

where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups: $R^1$, $R^2$, $R^3$, $R^4$, $R^5$, $R^6$ and $R^7$ may also be —SiR$^8$R$^9$R$^{10}$ where $R^8$, $R^9$, $R^{10}$ are each independently selected from a linear, branched or cyclic $C_1$ to $C_9$ alkyl, vinyl or aryl group. Under certain conditions when the disclosed In(III)-containing precursors have sufficiently small $R^1$, $R^2$ and $R^3$, the structure may exist as the dimeric structure

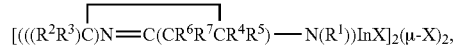

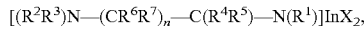

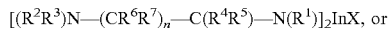

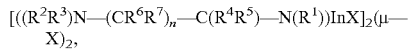 (c)

where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups; $R^1$, $R^2$, $R^3$, $R^4$, $R^5$, $R^6$ and $R^7$ may also be —SiR$^8$R$^9$R$^{10}$ where $R^8$, $R^9$, $R^{10}$ are each independently selected from a linear, branched or cyclic $C_1$ to $C_9$ alkyl, vinyl or aryl group. For In(III) containing precursors, =1 or 2 to provide either a 5-membered or 6-membered metallacycle, respectively. Groups $R^6$ and $R^7$ are not required to be identical for structures where n=2. Under certain conditions when the disclosed In(III)-containing precursors have sufficiently small $R^1$, $R^2$ and $R^3$ and n=1, the structure may exist as the dimeric structure [((R$^2$R$^3$)N—(CR$^6$R$^7$)$_n$—C(R$^4$R$^5$)—N(R$^1$))InX]$_2$(μ—X)$_2$,

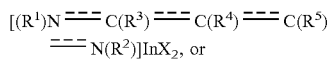

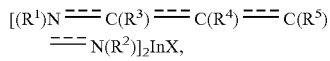 (d)

where X is a halogen, preferably chlorine. $R^1$, $R^2$, $R^3$, $R^4$ and $R^5$ are each independently selected from a linear, branched or cyclic $C_1$ to $C_9$ alkyl, vinyl or aryl groups; $R^1$, $R^2$, $R^3$, $R^4$ and $R^5$ may also be —SiR$^6$R$^7$R$^8$ where $R^6$, $R^7$, $R^8$ are each independently selected from a linear, branched or cyclic $C_1$ to $C_9$ alkyl, vinyl or aryl group. Groups $R^1$, $R^2$, $R^3$ and $R^5$ may also be selected from fluorinated linear or aromatic groups (e.g., $CF_3$, m-$(CF_3)_2$—$C_6H_3$, etc.). Group $R^4$ may also be selected from halogens, such as F, and

[N((SiR$^1$R$^2$R$^3$)R$^4$)]InX$_2$   (e)

where X is chosen from chlorine, bromine and iodine, preferably chlorine; $R^1$, $R^2$, and $R^3$ are each independently selected from hydrogen or a linear, branched or cyclic $C_1$ to $C_9$ alkyl, vinyl or aryl groups, $R^4$ is hydrogen or a linear, branched or cyclic $C_1$ to $C_9$ alkyl, vinyl or aryl group or a —SiR$^5$R$^6$R$^7$ group wherein $R^5$, $R^6$, and $R^7$ are each independently selected from hydrogen or a linear, branched or cyclic $C_1$ to $C_9$ alkyl, vinyl or aryl group.

The disclosed methods may include one or more of the following aspects:
further comprising the step of chemically reacting the chemisorbed and/or physisorbed film comprising the indium(III)-containing precursor with a co-reactant;
the co-reactant reacting with the indium(III)-containing precursor in the chemisorbed and/or physisorbed film producing a reaction product that forms the indium (III)-containing film on the surface of the substrate;
the co-reactant being selected from $O_3$, $O_2$, $H_2O$, NO, $N_2O$, $NO_2$, $H_2O_2$, O radicals and combinations thereof; and
the co-reactant being selected from $NH_3$, NO, $N_2O$, hydrazines, $N_2$ plasma, $N_2/H_2$ plasma, $NH_3$ plasma, amines and combinations thereof.

Also disclosed is a composition for deposition of a film comprising an indium(III)-containing precursor having the formula:

[(R$^1$)N ═══ C(R$^3$) ═══ N(R$^2$)]InX$_2$,

[(R$^1$)N ═══ C(R$^3$) ═══ N(R$^2$)]$_2$InX, or

[((R$^1$)N ═══ C(R$^3$) ═══ N(R$^2$))InX]$_2$(μ—X)$_2$,   (a)

wherein X is chosen from chlorine, bromine and iodine, preferably chlorine; $R^1$ and $R^2$ are each independently selected from a linear, branched or cyclic $C_1$ to $C_9$ alkyl, vinyl or aryl groups or —SiR$^4$R$^5$R$^6$ wherein $R^4$, $R^5$, $R^6$ are each independently selected from a linear, branched or cyclic $C_1$ to $C_9$ alkyl, vinyl or aryl groups; $R^3$ is selected from H or a linear, branched or cyclic $C_1$ to $C_9$ alkyl, vinyl or aryl group or —NR$^7$R$^8$ where $R^7$ and $R^8$ are each independently selected from H or a linear, branched or cyclic $C_1$ to $C_9$ alkyl, vinyl or aryl groups. Under certain conditions when the disclosed In(III)-containing precursors have sufficiently small $R^1$, $R^2$ and $R^3$, the structure may exist as the dimeric structure [((R$^1$)N ═══ C(R$^3$) ═══ N(R$^2$))InX]$_2$(μ—X)$_2$, (b)

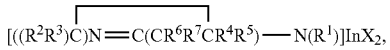
[((R$^2$R$^3$)C)N═C(CR$^6$R$^7$CR$^4$R$^5$)—N(R$^1$)]InX$_2$,
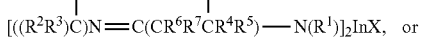
[((R$^2$R$^3$)C)N═C(CR$^6$R$^7$CR$^4$R$^5$)—N(R$^1$)]$_2$InX, or
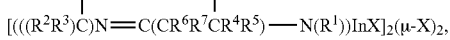
[(((R$^2$R$^3$)C)N═C(CR$^6$R$^7$CR$^4$R$^5$)—N(R$^1$))InX]$_2$(μ-X)$_2$, where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups; $R^1$, $R^2$, $R^3$, $R^4$, $R^5$, $R^6$ and $R^7$ may also be —SiR$^8$R$^9$R$^{10}$ where $R^8$, $R^9$, $R^{10}$ are each independently selected from a linear, branched or cyclic $C_1$ to $C_9$ alkyl, vinyl or aryl group. Under certain conditions when the disclosed In(III)-containing precursors have sufficiently small $R^1$, $R^2$ and $R^3$, the structure may exist as the dimeric structure

[(((R$^2$R$^3$)C)N═C(CR$^6$R$^7$CR$^4$R$^5$)—N(R$^1$))InX]$_2$(μ-X)$_2$,

[(R$^2$R$^3$)N—(CR$^6$R$^7$)$_n$—C(R$^4$R$^5$)—N(R$^1$)]InX$_2$,

[(R$^2$R$^3$)N—(CR$^6$R$^7$)$_n$—C(R$^4$R$^5$)—N(R$^1$)]$_2$InX, or

[((R$^2$R$^3$)N—(CR$^6$R$^7$)$_n$—C(R$^4$R$^5$)—N(R))InX]$_2$(μ—X)$_2$,   (c)

where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups; $R^1$, $R^2$, $R^3$, $R^4$, $R^5$, $R^6$ and $R^7$ may also be —SiR$^8$R$^9$R$^{10}$ where $R^8$, $R^9$, $R^{10}$ are each independently selected from a linear, branched or cyclic $C_1$ to $C_9$ alkyl, vinyl or aryl group. For these In(III) containing precursors, n=1 or 2 will provide either a 5-membered or 6-membered metallacycle, respectively. Groups $R^6$ and $R^7$ are not required to be identical for structures where n=2. Under certain conditions when the disclosed In(III)-containing precursors have sufficiently small $R^1$, $R^2$ and $R^3$ and n=1, the structure may exist as the dimeric structure [((R$^2$R$^3$)N—(CR$^6$R$^7$)$_n$—C(R$^4$R$^5$)—N(R$^1$))InX]$_2$(μ—X)$_2$

[(R$^1$)N ═══ (R$^3$) ═══ C(R$^4$) ═══ C(R$^5$) ═══ N(R$^2$)]InX$_2$, or

[(R$^1$)N ═══ C(R$^3$) ═══ C(R$^4$) ═══ C(R$^5$) ═══ N(R$^2$)]$_2$InX,   (d)

where X is a halogen, preferably chlorine. $R^1$, $R^2$, $R^3$, $R^4$ and $R^5$ are each independently selected from a linear, branched or cyclic $C_1$ to $C_9$ alkyl, vinyl or aryl groups; $R^1$, $R^2$, $R^3$, $R^4$ and $R^5$ may also be —SiR$^6$R$^7$R$^8$ where $R^6$, $R^7$, $R^8$ are each independently selected from a linear, branched or cyclic $C_1$ to $C_9$ alkyl, vinyl or aryl group. Groups $R^1$, $R^2$, $R^3$ and $R^5$ may also be selected from fluorinated linear or aromatic groups (e.g., $CF_3$, m-$(CF_3)_2$—$C_6H_3$, etc.). Group $R^4$ may also be selected from halogens, such as F, and

[N((SiR$^1$R$^2$R$^3$)R$^4$)]InX$_2$   (e)

where X is chosen from chlorine, bromine and iodine, preferably chlorine; $R^1$, $R^2$, and $R^3$ are each independently selected from hydrogen or a linear, branched or cyclic $C_1$ to $C_9$ alkyl, vinyl or aryl groups, $R^4$ is hydrogen or a linear, branched or cyclic $C_1$ to $C_9$ alkyl, vinyl or aryl group or a —SiR$^5$R$^6$R$^7$ group wherein $R^5$, $R^6$, and $R^7$ are each independently selected from hydrogen or a linear, branched or cyclic $C_1$ to $C_9$ alkyl, vinyl or aryl group.

The disclosed methods may include one or more of the following aspects:
X being chloride;
the indium(III)-containing precursor being selected from [(Et)N ═══ C(Me) ═══ N(tBu)]In(III)Cl$_2$, [(iPr)N ═══ CH ═══ N(iPr)]In(III)Cl$_2$, [(Et)N ═══ C(Me) ═══ N(tBu)]In(III)Cl$_2$ or [(iPr)N ═══ C(nBu) ═══ N(iPr)]In(III)Cl$_2$;
the indium(III)-containing precursor being [(Et)N ═══ C(Me) ═══ N(tBu)]In(III)Cl$_2$;

the indium(III)-containing precursor being [(iPr)N===CH===N(iPr)]In(III)Cl$_2$;

the indium(III)-containing precursor being [(Et)N===C(Me)===(tBu)]In(III)Cl$_2$;

the indium(III)-containing precursor being [(iPr)N===C(nBu)===N(iPr)]In(III)Cl$_2$;

the indium(III)-containing precursor having a purity ranging from approximately 93% w/w to approximately 100% w/w; and the indium(III)-containing precursor having a purity ranging from approximately 99% w/w to approximately 99.999% w/w.

Notation and Nomenclature

The following detailed description and claims utilize a number of abbreviations, symbols, and terms, which are generally well known in the art. Certain abbreviations, symbols, and terms are used throughout the following description and claims, and include:

As used herein, the indefinite article "a" or "an" means one or more.

As used herein, "about" or "around" or "approximately" in the text or in a claim means±10% of the value stated.

As used herein, "room temperature" in the text or in a claim means from approximately 20° C. to approximately 25° C.

The term "ambient temperature" refers to an environment temperature approximately 20° C. to approximately 25° C.

The term "substrate" refers to a material or materials on which a process is conducted. The substrate may refer to a wafer having a material or materials on which a process is conducted. The substrates may be any suitable wafer used in semiconductor, photovoltaic, flat panel, or LCD-TFT device manufacturing. The substrate may also have one or more layers of differing materials already deposited upon it from a previous manufacturing step. For example, the wafers may include silicon layers (e.g., crystalline, amorphous, porous, etc.), silicon containing layers (e.g., SiO$_2$, SiN, SiON, SiCOH, etc.), metal containing layers (e.g., copper, cobalt, ruthenium, tungsten, platinum, palladium, nickel, ruthenium, gold, etc.) or combinations thereof. Furthermore, the substrate may be planar or patterned. The substrate may be an organic patterned photoresist film. The substrate may include layers of oxides which are used as dielectric materials in MEMS, 3D NAND, MIM, DRAM, or FeRam device applications (for example, ZrO$_2$ based materials, HfO$_2$ based materials, TiO$_2$ based materials, rare earth oxide based materials, ternary oxide based materials, etc.) or nitride-based films (for example, TaN, TiN, NbN) that are used as electrodes. One of ordinary skill in the art will recognize that the terms "film" or "layer" used herein refer to a thickness of some material laid on or spread over a surface and that the surface may be a trench or a line. Throughout the specification and claims, the wafer and any associated layers thereon are referred to as substrates.

The term "wafer" or "patterned wafer" refers to a wafer having a stack of films on a substrate and at least the top-most film having topographic features that have been created in steps prior to the deposition of the indium containing film.

The term "aspect ratio" refers to a ratio of the height of a trench (or aperture) to the width of the trench (or the diameter of the aperture).

Note that herein, the terms "film" and "layer" may be used interchangeably. It is understood that a film may correspond to, or related to a layer, and that the layer may refer to the film. Furthermore, one of ordinary skill in the art will recognize that the terms "film" or "layer" used herein refer to a thickness of some material laid on or spread over a surface and that the surface may range from as large as the entire wafer to as small as a trench or a line.

Note that herein, the terms "aperture", "via", "hole" and "trench" may be used interchangeably to refer to an opening formed in a semiconductor structure.

As used herein, the abbreviation "NAND" refers to a "Negative AND" or "Not AND" gate; the abbreviation "2D" refers to 2 dimensional gate structures on a planar substrate; the abbreviation "3D" refers to 3 dimensional or vertical gate structures, wherein the gate structures are stacked in the vertical direction.

Note that herein, the terms "deposition temperature" and "substrate temperature" may be used interchangeably. It is understood that a substrate temperature may correspond to, or be related to a deposition temperature, and that the deposition temperature may refer to the substrate temperature.

Note that herein, the terms "precursor" and "deposition compound" and "deposition gas" may be used interchangeably when the precursor is in a gaseous state at room temperature and ambient pressure. It is understood that a precursor may correspond to, or be related to a deposition compound or deposition gas, and that the deposition compound or deposition gas may refer to the precursor.

The standard abbreviations of the elements from the periodic table of elements are used herein. It should be understood that elements may be referred to by these abbreviation (e.g., Si refers to silicon, N refers to nitrogen, O refers to oxygen, C refers to carbon, H refers to hydrogen, F refers to fluorine, etc.).

The unique CAS registry numbers (i.e., "CAS") assigned by the Chemical Abstract Service are provided to identify the specific molecules disclosed.

Please note that the silicon-containing films, such as SiN and SiO, are listed throughout the specification and claims without reference to their proper stoichiometry. The silicon-containing films may include pure silicon (Si) layers, such as crystalline Si, polysilicon (p-Si or polycrystalline Si), or amorphous silicon; silicon nitride (Si$_k$N$_l$) layers; or silicon oxide (Si$_n$O$_m$) layers; or mixtures thereof, wherein k, l, m, and n, inclusively range from 0.1 to 6. Preferably, silicon nitride is SiN, where k and l each range from 0.5 to 1.5. More preferably silicon nitride is Si$_3$N$_4$. Herein, SiN in the following description may be used to represent SiN containing layers. Preferably silicon oxide is Si$_n$O$_m$, where n ranges from 0.5 to 1.5 and m ranges from 1.5 to 3.5. More preferably, silicon oxide is SiO$_2$. Herein, SiO in the following description may be used to represent Si$_n$O$_m$ containing layers. The silicon-containing film could also be a silicon oxide based dielectric material such as organic based or silicon oxide based low-k dielectric materials such as the Black Diamond II or III material by Applied Materials, Inc. with a formula of SiOCH. Silicon-containing film may also include Si$_a$O$_b$N$_c$ where a, b, c range from 0.1 to 6. The silicon-containing films may also include dopants from group III, IV, V and VI, such as B, C, P, As and/or Ge.

As used herein, the term "hydrocarbon" refers to a saturated or unsaturated function group containing exclusively carbon and hydrogen atoms. As used herein, the term "alkyl group" refers to saturated functional groups containing exclusively carbon and hydrogen atoms. An alkyl group is one type of hydrocarbon. Further, the term "alkyl group" refers to linear, branched, or cyclic alkyl groups. Examples of linear alkyl groups include without limitation, methyl groups, ethyl groups, propyl groups, butyl groups, etc. Examples of branched alkyls groups include without limitation, t-butyl. Examples of cyclic alkyl groups include without limitation, cyclopropyl groups, cyclopentyl groups, cyclohexyl groups, etc.

As used herein, the abbreviation "Me" refers to a methyl group; the abbreviation "Et" refers to an ethyl group; the abbreviation "Pr" refers to any propyl group (i.e., n-propyl or isopropyl); the abbreviation "iPr" refers to an isopropyl group; the abbreviation "Bu" refers to any butyl group (n-butyl, iso-butyl, tert-butyl, sec-butyl); the abbreviation "tBu" refers to a tert-butyl group; the abbreviation "sBu" refers to a sec-butyl group; the abbreviation "iBu" refers to an iso-butyl group; the abbreviation "Ph" refers to a phenyl group; the abbreviation "Am" refers to any amyl group (iso-amyl, sec-amyl, tert-amyl); the abbreviation "Cy" refers to a cyclic hydrocarbon group (cyclobutyl, cyclopentyl, cyclohexyl, etc.); the abbreviation "Ar" refers to an aromatic hydrocarbon group (phenyl, xylyl, mesityl, etc.).

As used herein, the formulas, $[(R^1)N=C(R^3)=N(R^2)]InX$ or $[((R^1)N=C(R^3)=N(R^2))InX]_2(\mu-X)_2$ are represented by the following structures:

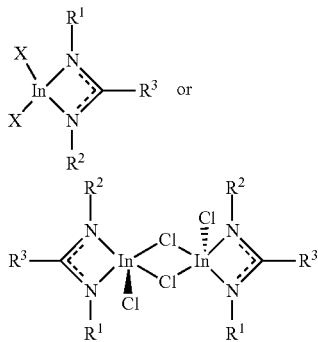

wherein X is chosen from chlorine, bromine and iodine, preferably chlorine; $R^1$ and $R^2$ are each independently selected from a linear, branched or cyclic $C_1$ to $C_9$ alkyl, vinyl or aryl groups or $-SiR^4R^5R^6$ wherein $R^4$, $R^5$, $R^6$ are each independently selected from a linear, branched or cyclic $C_1$ to $C_9$ alkyl groups; $R^3$ is selected from H or a linear, branched or cyclic $C_1$ to $C_9$ alkyl, vinyl or aryl group or $-NR^7R^8$ where $R^7$ and $R^8$ are each independently selected from H or a linear, branched or cyclic $C_1$ to $C_9$ alkyl, vinyl or aryl groups. Under certain conditions when the disclosed In(III)-containing precursors have sufficiently small $R^1$, $R^2$ and $R^3$, the structure may exist as the dimeric structure $[((R^1)N=C(R^3)=N(R^2))InX]_2(\mu-X)_2$.

As used herein, the formula, $[(R^1)N=C(R^3)=N(R^2)]_2InX$, is represented by the following structure:

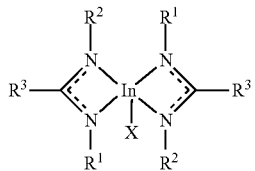

wherein X is chosen from chlorine, bromine and iodine, preferably chlorine; $R^1$ and $R^2$ are each independently selected from a linear, branched or cyclic $C_1$ to $C_9$ alkyl, vinyl or aryl groups or $-SiR^4R^5R^6$ wherein $R^4$, $R^5$, $R^6$ are each independently selected from a linear, branched or cyclic $C_1$ to $C_9$ alkyl, vinyl or aryl groups; $R^3$ is selected from H or a linear, branched or cyclic $C_1$ to $C_9$ alkyl, vinyl or aryl group or $-NR^7R^8$ where $R^7$ and $R^8$ are each independently selected from H or a linear, branched or cyclic $C_1$ to $C_9$ alkyl, vinyl or aryl groups.

As used herein, the formulas,

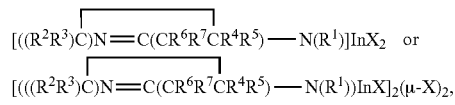

are represented by the following structures:

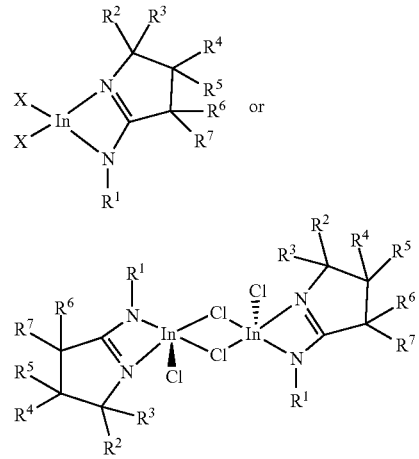

where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups; $R^1$, $R^2$, $R^3$, $R^4$, $R^5$, $R^6$ and $R^7$ may also be $-SiR^8R^9R^{10}$ where $R^8$, $R^9$, $R^{10}$ are each independently selected from a linear, branched or cyclic $C_1$ to $C_9$ alkyl, vinyl or aryl group. Under certain conditions when the disclosed IN(III)-containing precursors have sufficiently small $R^1R^2$ and $R^3$, the structure may exist as the dimeric structure

As used herein, the formula

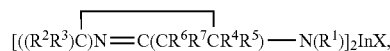

represented by the following structure:

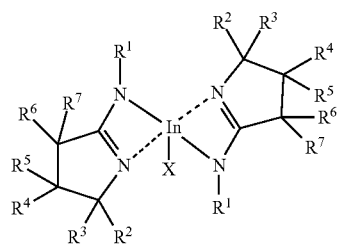

As used herein, the formulas, $[(R^2R^3)N-(CR^6R^7)_n-C(R^4R^5)-N(R^1)]InX_2$ or $[((R^2R^3)N-(CR^6R^7)_n-C(R^4R^5)-N(R^1))InX]_2(\mu-X)_2$, are represented by the following structures:

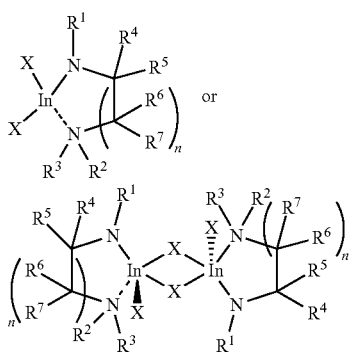

where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups; $R^1$, $R^2$, $R^3$, $R^4$, $R^5$, $R^6$ and $R^7$ may also be —$SiR^8R^9R^{10}$ where $R^8$, $R^9$, $R^{10}$ are each independently selected from a linear, branched or cyclic $C_1$ to $C_9$ alkyl, vinyl or aryl group. For these In(III) containing precursors, n=1 or 2 will provide either a 5-membered or 6-membered metallacycle, respectively. Groups $R^6$ and $R^7$ are not required to be identical for structures where n=2. Under certain conditions when the disclosed In(III)-containing precursors have sufficiently small $R^1$, $R^2$ and $R^3$ and n=1, the structure may exist as the dimeric structure $[((R^2R^3)N—(CR^6R^7), —C(R^4R^5)—N(R^1))InX]_2(\mu—X)_2$.

As used herein, the formula, $[(R^2R^3)N—(CR^6R^7)_n—C(R^4R^5)—N(R^1)]_2InX$, is represented by the following structure:

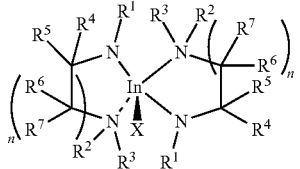

where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups; $R^1$, $R^2$, $R^3$, $R^4$, $R^5$, $R^6$ and $R^7$ may also be —$SiR^8R^9R^{10}$ where $R^8$, $R^9$, $R^{10}$ are each independently selected from a linear, branched or cyclic $C_1$ to $C_9$ alkyl, vinyl or aryl group.

As used herein, the formula, $[(R^1)N═C(R^3)═C(R^4)═C(R^5)═N(R^2)]InX_2$, is represented by the following structure:

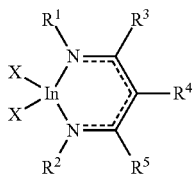

where X is a halogen, preferably chlorine. $R^1$, $R^2$, $R^3$, $R^4$ and $R^5$ are each independently selected from a linear, branched or cyclic $C_1$ to $C_9$ alkyl, vinyl or aryl groups; $R^1$, $R^2$, $R^3$, $R^4$ and $R^5$ may also be —$SiR^6R^7R^8$ where $R^6$, $R^7$, $R^8$ are each independently selected from a linear, branched or cyclic $C_1$ to $C_9$ alkyl, vinyl or aryl group. Groups $R^1$, $R^2$, $R^3$ and $R^5$ may also be selected from fluorinated linear or aromatic groups (e.g., $CF_3$, m-$(CF_3)_2$—$C_6H_3$, etc.). Group $R^4$ may also be selected from halogens, such as F.

As used herein, the formula, $[(R^1)N═C(R^3)═C(R^4)═C(R^5)═N(R^2)]_2InX$, is represented by the following structure:

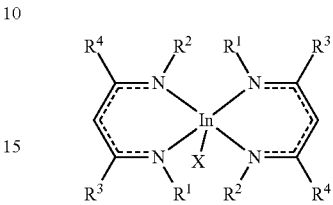

where X is a halogen, preferably chlorine. $R^1$, $R^2$, $R^3$, $R^4$ and $R^5$ are each independently selected from a linear, branched or cyclic $C_1$ to $C_9$ alkyl, vinyl or aryl groups; $R^1$, $R^2$, $R^3$, $R^4$ and $R^5$ may also be —$SiR^6R^7R^8$ where $R^6$, $R^7$, $R^8$ are each independently selected from a linear, branched or cyclic $C_1$ to $C_9$ alkyl, vinyl or aryl group. Groups $R^1$, $R^2$, $R^3$ and $R^5$ may also be selected from fluorinated linear or aromatic groups (e.g., $CF_3$, m-$(CF_3)_2$—$C_6H_3$, etc.). Group $R^4$ may also be selected from halogens, such as F.

As used herein, the formula, $[N((SiR^1R^2R^3)R^4)]InX_2$, is represented by the following structure:

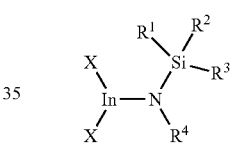

where X is chosen from chlorine, bromine and iodine, preferably chlorine; $R^1$, $R^2$, and $R^3$ are each independently selected from hydrogen or a linear, branched or cyclic $C_1$ to $C_9$ alkyl, vinyl or aryl groups, $R^4$ is hydrogen or a linear, branched or cyclic $C_1$ to $C_9$ alkyl, vinyl or aryl group or a —$SiR^5R^6R^7$ group wherein $R^5$, $R^6$, and $R^7$ are each independently selected from hydrogen or a linear, branched or cyclic $C_1$ to $C_9$ alkyl, vinyl or aryl group.

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

Reference herein to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used herein, the term "independently" when used in the context of describing R groups should be understood to denote that the subject R group is not only independently selected relative to other R groups bearing the same or different subscripts or superscripts, but is also independently selected relative to any additional species of that same R group. For example in the formula $MR^1_x(NR^2R^3)_{(4-x)}$, where x is 2 or 3, the two or three $R^1$ groups may, but need not be identical to each other or to $R^2$ or to $R^3$. Further, it should be understood that unless specifically stated otherwise, values of R groups are independent of each other when used in different formulas.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

"Comprising" in a claim is an open transitional term which means the subsequently identified claim elements are a nonexclusive listing (i.e., anything else may be additionally included and remain within the scope of "comprising"). "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actors in the absence of express language in the claim to the contrary.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
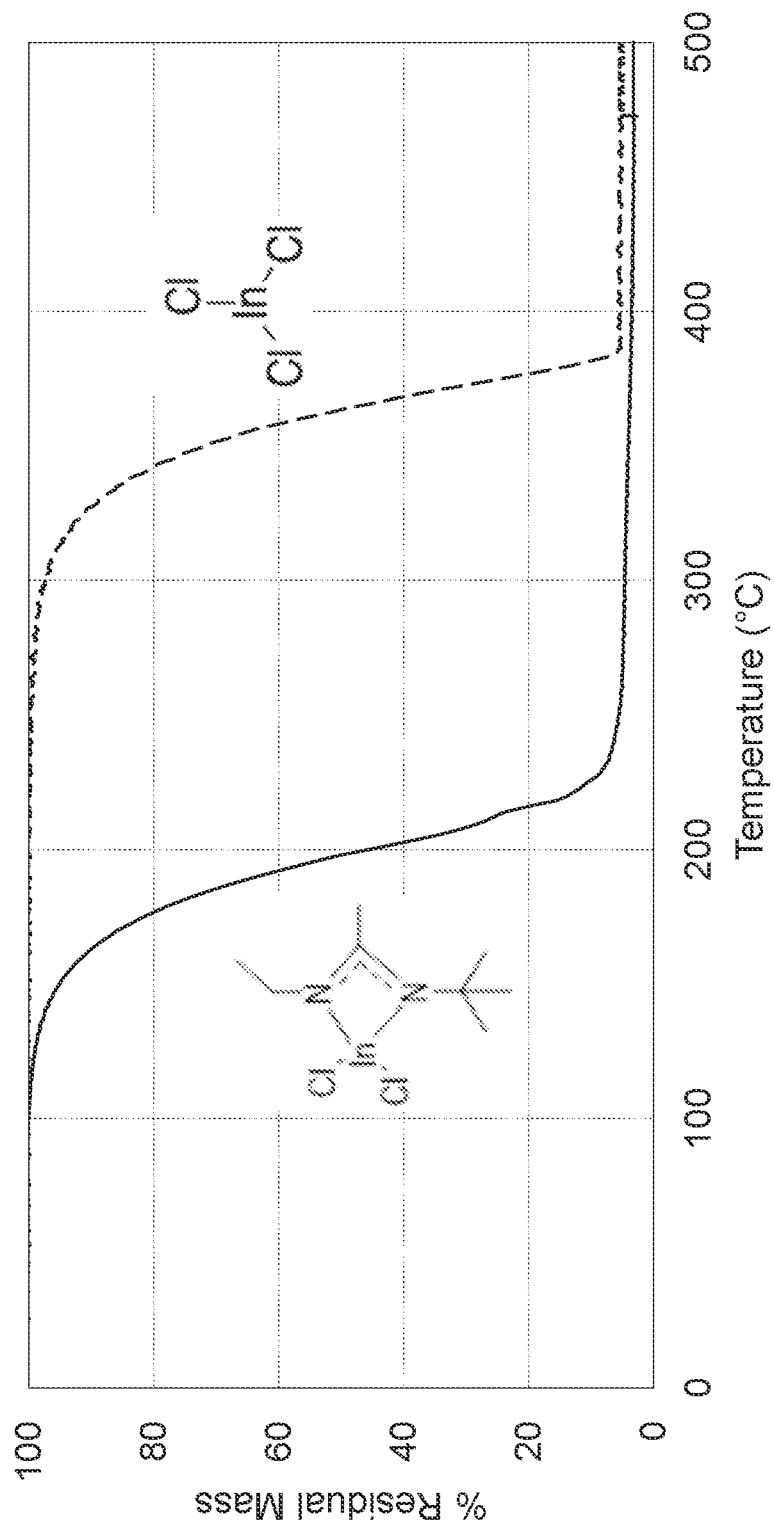
FIG. 1 is vacuum thermogravimetric analysis (TGA) results for [(Et)N═C(Me)═N(tBu)]In(III)Cl$_2$.

Disclosed are indium (In)-containing film and/or indium-containing alloy film forming compositions comprising In(III)-containing precursors that contain halogens, methods of synthesizing them and methods of using them to deposit the indium-containing films and/or indium-containing alloy film.

Although some homoleptic indium precursors exist, there is a lack of heteroleptic complexes containing halogens available for use as precursors. The advantage of using heteroleptic compounds is the ability to incorporate organic ligands as well as other reactivity ligands such as halogens that may be beneficial for the desired surface chemistry. InCl$_3$ has been used for deposition, however, InCl$_3$ has very low volatility (boiling point 800° C., I torr vapor pressure at 310° C.) making it difficult to use for most applications. The disclosed In(III)-containing precursors not only include at least one halogen but also include an organic ligand that greatly increases the volatility relative to InCl$_3$ to the point that the vapor pressure of the disclosed In(III)-containing precursors is sufficient for commercially viable vapor phase deposition (e.g.: CVD and ALD) processes. The disclosed In(III)-containing precursors herein are indium(III) containing precursors that will be denoted as In(III)-containing precursors throughout the entire patent application.

The disclosed In(III)-containing precursors contain one or two halogen ligands. More preferably, the disclosed In(III)-containing precursors contain chlorine with nitrogen based ligands, which are suitable for vapor phase depositions of the indium-containing films and/or indium-containing alloy films.

The disclosed In(III)-containing precursors include the following categories.

In the first embodiment, the disclosed In(III)-containing precursors contains 1 or 2 amidinate ligands having the formula:

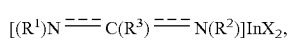

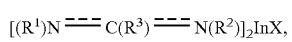

or

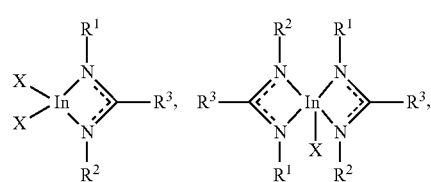

-continued

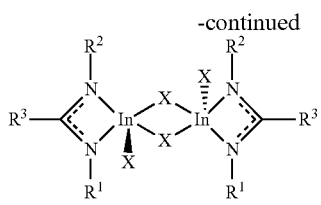

wherein X is chosen from chlorine, bromine and iodine, preferably chlorine; $R^1$ and $R^2$ are each independently selected from a linear, branched or cyclic $C_1$ to $C_9$ alkyl, vinyl or aryl groups or —$SiR^4R^5R^6$ wherein $R^4$, $R^5$, $R^6$ are each independently selected from a linear, branched or cyclic $C_1$ to $C_9$ alkyl, vinyl or aryl groups; $R^3$ is selected from H or a linear, branched or cyclic $C_1$ to $C_8$ alkyl, vinyl or aryl group or —$NR^7R^8$ where $R^7$ and $R^8$ are each independently selected from H or a linear, branched or cyclic $C_1$ to $C_9$ alkyl, vinyl, or aryl group.

Exemplary precursors having the formula $[(R^1)N\!=\!\!=\!\!C(R^3)\!=\!\!=\!\!N(R^2)]InX_2$ include:

- X=Cl, $R^1$=$R^2$=iPr, $R^3$=tBu, [(iPr)N=C(tBu)=N(iPr)]InCl$_2$ (N,N'-diisopropyl-tert-butylamidinato)indium(III) dichloride);
- X=Cl, $R^1$=Et, $R^2$=tBu, $R^3$=Me, [(Et)N=C(Me)=N(tBu)]InCl$_2$ (N-tert-butyl-N'-ethylacetamidinato) indium(III) dichloride);
- X=Cl, $R^1$=Et, $R^2$=$R^3$=tBu, [(Et)N=C(tBu)=N(tBu)]InCl$_2$ (N-tert-butyl-N-ethylbutylamidinato)indium(III) dichloride);
- X=Cl, $R^1$=$R^2$=Ph, $R^3$=Me, [(Ph)N=C(Me)=N(Ph)]InCl$_2$ (N,N-diphenylacetamidinato)indium(III) dichloride);
- X=Cl, $R^1$=$R^2$=iPr, $R^3$=NEt$_2$, [(iPr)N=C(NEt$_2$)=N(iPr)]InCl$_2$ (N,N'-diisopropyl-2-diethylamido-guanidinato)indium dichloride); and
- X=Cl, $R^1$=Et, $R^2$=tBu, $R^3$=NEt$_2$, [(Et)N=C(NEt$_2$)=N(tBu)]InCl$_2$ (N-tert-butyl-N'-ethyl-2-diethyl-amido-guanidinato)indium dichloride).

Exemplary precursors having the formula $[(R^1)N\!=\!C(R^3)—N(R^2)]_2InX$ include:

- X=Cl, $R^1$=$R^2$=iPr, $R^3$=nBu, [(iPr)N=C(nBu)=N(iPr)]$_2$InCl (bis-(N,N'-diisopropylbutylamidinato)indium(III) chloride));
- X=Cl, $R^1$=$R^2$=iPr, $R^3$=H, [(iPr)N=C(H)=N(iPr)]$_2$InCl (bis-(N,N'-diisopropylformamidinato)indium(III) chloride));
- X=Cl, $R^1$=Et, $R^2$=tBu, $R^3$=Me, [(Et)N=C(Me)=N(tBu)]$_2$InCl (bis-(N-tert-butyl-N'-ethylacetamidinato)indium(III) chloride));
- X=Cl, $R^1$=Et, $R^2$=tBu, $R^3$=nBu, [(Et)N=C(nBu)=N(tBu)]$_2$InCl (bis-(N-tert-butyl-N'-ethylbutylamidinato)indium(III) chloride));
- X=Cl, $R^1$=$R^2$=Ph, $R^3$=Me, [(Ph)N=C(Me)=N(Ph)]$_2$InCl (bis-(N,N'-diphenylacetamidinato)indium(III) chloride));
- X=Cl, $R^1$=$R^2$=$R^1$=$R^2$=iPr, $R^3$=NEt$_2$, [(iPr)N=C(NEt$_2$)=N(iPr)]$_2$InCl (bis-(N,N'-diisopropyl-2-diethyl-amido-guanidinato))indium(III) chloride); and
- X=Cl, $R^1$=Et, $R^2$=tBu, $R^3$=NEt$_2$, [(Et)N=C(NEt$_2$)=N(tBu)]$_2$InCl (bis-(N-tert-butyl-N'-ethyl-2-diethyl-amido-guanidinato)indium(III)).

When the disclosed In(III)-containing precursors have sufficiently small $R^1$, $R^2$ and $R^3$, the structure may exists as a dimer under certain conditions with the formula $[((R^1)N\!=\!\!=\!\!C(R^3)\!=\!\!=\!\!N(R^2))InX]_2(\mu—X)_2$. Exemplary precursors having the formula $[((R^1)N\!=\!\!=\!\!C(R^3)\!=\!\!=\!\!N(R^2))InX]_2(\mu—X)_2$ include:

- X=Cl, $R^1$=$R^2$=$R^3$=H [((H)N=C(H)=N(H))InCl]$_2$($\mu$—Cl)$_2$;
- X=Cl, $R^1$=$R^2$=$R^3$=Me [((Me)N=C(Me)=N(Me))InCl]$_2$($\mu$—Cl)$_2$ (N,N'-dimethyl-acetamidinato)indium(III) dichloride);
- X=Cl, $R^1$=$R^2$=Me, $R^3$=H, [((Me)N=C(H)=N(Me))InCl]$_2$($\mu$—Cl)$_2$ (N,N'-dimethylformamidinato)indium(III) dichloride);
- X=Cl, $R^1$=$R^2$=Et, $R^3$=H, [((Et)N=C(H)=N(Et))$_1$InCl]$_2$($\mu$—Cl)$_2$ (N,N'-diethylformamidinato)indium(III) dichloride); and
- X=Cl, $R^1$=$R^2$=iPr, $R^3$=H, [((iPr)N=C(H)=N(iPr))InCl]$_2$($\mu$—Cl)$_2$ (N,N'-diisopropylformamidinato)indium(III) dichloride);

In the second embodiment, the disclosed In(III)-containing compounds contains 1 or 2 iminopyrrolidinate ligands having the formula:

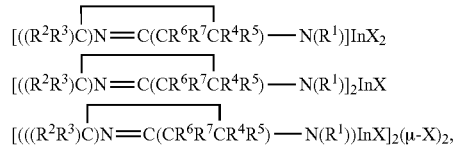

or

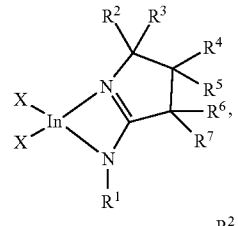

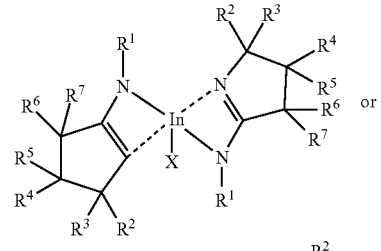

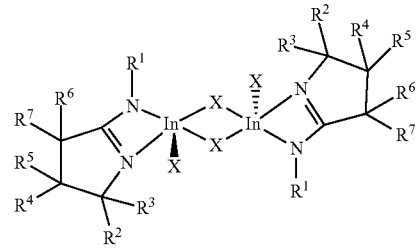

where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups; $R^1$, $R^2$, $R^3$, $R^4$, $R^5$, $R^6$ and $R^7$ may also be —$SiR^8R^9R^{10}$ where $R^8$, $R^9$, $R^{10}$ are each independently selected from a linear, branched or cyclic $C_1$ to $C_9$ alkyl, vinyl or aryl group.

Exemplary precursors having the formula $$[((R^2R^3)C)N=C(CR^6R^7CR^4R^5)-N(R^1)]InX_2$$

include:
$R^1$=tBu, $R^2$=$R^3$=Me, $R^4$=$R^5$=$R^6$=$R^7$=H, $$[((Me_2)C)N=C(CH_2CH_2)-N(tBu)]InCl_2$$

(tert-butyl-imino-2,2-diethylpyrrolidinate-N,N')indium(III) dichloride;
X=Cl, $R^1$=iPr $R^2$=$R^3$=Me, $R^4$=$R^5$=$R^6$=$R^7$=H, $$[((Et_2)C)N=C(CH_2CH_2)-N(tBu)]InCl_2$$

(tert-butyl-imino-2,2-diethylpyrrolidinate-N,N')indium(III) dichloride; and
X=Cl, $R^1$=tBu, $R^2$=$R^3$=Me, $R^4$=$R^5$=$R^6$=$R^7$=H, $$[((Et)(Me)C)N=C(CH_2CH_2)-N(tBu)]InCl_2$$

(tert-butyl-imino-2-ethyl-2-methylpyrrolidinate-N,N')indium(III) dichloride;

Exemplary precursors having the formula $$[((R^2R^3)C)N=C(CR^6R^7CR^4R^5)-N(R^1)]_2InX$$

include:
X=Cl, $R^1$=tBu, $R^2$=$R^3$=Et, $R^4$=$R^5$=$R^6$=$R^7$=H, $$[((Me_2)C)N=C(CH_2CH_2)-N(iPr)]_2InCl$$

(bis-(isopropyl-imino-2,2-diethylpyrrolidinate-N,N')indium (III) chloride;
X=Cl, $R^1$=tBu, $R^2$=Et, $R^3$=Me, $R^4$=$R^5$=$R^6$=$R^7$=H, $$[((Me_2)C)N=C(CH_2CH_2)-N(tBu)]_2InCl$$

(bis-(tert-butyl-imino-2,2-dimethylpyrrolidinate-N,N')indium(III) chloride; and
X=Cl, $R^1$=tBu, $R^2$=Et, $R^3$=Me, $R^4$=$R^5$=$R^6$=$R^7$=H, $$[((Et_2)C)N=C(CH_2CH_2)-N(tBu)]_2InCl$$

(bis-(tert-butyl-imino-2,2-diethylpyrrolidinate-N,N')indium (III) chloride; and

X=Cl, $R^1$=tBu, $R^2$=Et, $R^3$=Me, $R^4$=$R^5$=$R^6$=$R^7$=H, $$[((Et)(Me)C)N=C(CH_2CH_2)-N(tBu)]_2InCl$$

(bis-(tert-butyl-imino-2-ethyl-2-methylpyrrolidinate-N,N') indium(III) chloride.

When the disclosed Indium (III) precursors have sufficiently small $R^1$, $R^2$ and $R^3$, the structure may exists as a dimer under certain conditions with the formula $$[(((R^2R^3)C)N=C(CR^6R^7CR^4R^5)-N(R^1))InX]_2(\mu-X)_2.$$

Exemplary precursors having the formula $$[(((R^2R^3)C)N=C(CR^6R^7CR^4R^5)-N(R^1))InX]_2(\mu-X)_2$$

include:
X=Cl, $R^1$=$R^2$=$R^3$=$R^4$=$R^5$=$R^6$=$R^7$=H, $$[(((H_2)C)N=C(CH_2CH_2)-N(H))InCl]_2(\mu-Cl)_2;$$

X=Cl, $R^1$=$R^2$=$R^3$=Me, $R^4$=$R^5$=$R^6$=$R^7$=H, $$[(((Me_2)C)N=C(CH_2CH_2)-N(Me))InCl]_2(\mu-Cl)_2;$$

X=Cl, $R^1$=Me, $R^2$=$R^3$=$R^4$=$R^5$=$R^6$=$R^7$=H, $$[(((H_2)C)N=C(CH_2CH_2)-N(Me))InCl]_2(\mu-Cl)_2;$$

and
X=Cl, $R^1$=iPr, $R^2$=$R^3$=$R^4$=$R^5$=$R^6$=$R^7$=H, $$[(((H_2)C)N=C(CH_2CH_2)-N(iPr))InCl]_2(\mu-Cl)_2.$$

In the third embodiment, the disclosed In(III)-containing precursors contains 1 or 2 amido amino alkane ligands having the formula:

$$[(R^2R^3)N-(CR^6R^7)_n-C(R^4R^5)-N(R^1)]InX_2,$$

$$[(R^2R^3)N-(CR^6R^7)_n-C(R^4R^5)-N(R^1)]_2InX,$$

$$[((R^2R^3)N-(CR^6R^7)_n-C(R^4R^5)-N(R^1))InX]_2(\mu-X)_2,$$

or

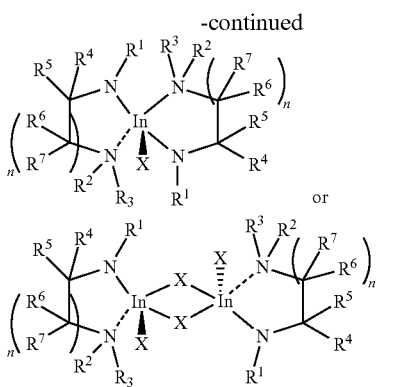

where X is chosen from chlorine, bromine and iodine, preferably chlorine; $R^1$, $R^2$, $R^3$, $R^4$, $R^5$, $R^6$ and $R^7$ are each independently selected from a linear, branched or cyclic $C_1$ to $C_9$ alkyl, vinyl or aryl groups; $R^1$, $R^2$, $R^3$, $R^4$, $R^5$, $R^6$ and $R^7$ may also be —$SiR^8R^9R^{10}$ where $R^8$, $R^9$, $R^{10}$ are each independently selected from a linear, branched or cyclic $C_1$ to $C_9$ alkyl, vinyl or aryl group. For these In(III) containing precursors, n=1 or 2 will provide either a 5-membered or 6-membered metallacycle, respectively. Groups $R^6$ and $R^7$ are not required to be identical for structures wherein n=2.

Exemplary precursors having the formula [($R^2R^3$)N—($CR^6R^7$)$_n$—C($R^4R^5$)—N($R^1$)]In$X_2$ include:

X=Cl, $R^1$=$R^2$=$R^3$=iPr, $R^4$=$R^5$=$R^6$=$R^7$=H, n=1, [(i$P_2$)N—$CH_2$—$CH_2$—N(iPr)]In$Cl_2$ (1-isopropylamide-2-diisopropylaminoethane-N,N')Indium(III) dichloride);

X=Cl, $R^1$=tBu, $R^2$=$R^3$=Me, $R^4$=$R^5$=$R^6$=$R^7$=H, n=1, [($Me_2$)N—$CH_2$—$CH_2$—N(tBu)]In$Cl_2$ (1-tert-butylamide-2-dimethylaminoethane-N,N')Indium(III) dichloride);

X=Cl, $R^1$=tBu, $R^2$=$R^3$=Me, $R^4$=$R^5$=$R^6$=$R^7$=H, n=2, [($Me_2$)N—$CH_2$—$CH_2$—$CH_2$—N(tBu)]In$Cl_2$ (1-tert-butylamide-3-dimethylaminopropane-N,N')Indium(III) dichloride); and X=Cl, $R^1$=tBu, $R^2$=$R^3$=$R^4$=Me, $R^5$=$R^6$=$R^7$=H, n=1, [($Me_2$)N—$CH_2$—$CH_2$—$CH_2$—N(tBu)]In$Cl_2$ (1-tert-butylamide-2-dimethylaminopropane-N,N')Indium(III) dichloride).

Exemplary precursors having the formula [($R^2R^3$)N—($CR^6R^7$)$_n$—C($R^4R^5$)—N($R^1$)]$_2$InX include:

X=Cl, $R^1$=iPr, $R^2$=$R^3$=Me, $R^4$=$R^5$=$R^6$=$R^7$=H, n=1, [($Me_2$)N—$CH_2$—$CH_2$—N(iPr)]$_2$InCl (bis-(1-isopropylamide-2-dimethylaminoethane-N,N')Indium(III) chloride));

X=Cl, $R^1$=$R^2$=$R^3$=Et, $R^4$=$R^5$=$R^6$=$R^1$=H, n=1, [($Et_2$)N—$CH_2$—$CH_2$—N(Et)]$_2$InCl (bis-(1-ethylamide-2-diethylaminoethane-N,N')Indium(III) chloride));

X=Cl, $R^1$=$R^2$=$R^3$=Me, $R^4$=$R^5$=$R^6$=$R^7$=H, n=2, [($Me_2$)N—$CH_2$—$CH_2$—$CH_2$—N(Me)]$_2$InCl (bis-(1-methylamide-2-dimethylaminopropane-N,N')Indium(III) chloride));

X=Cl, $R^1$=tBu, $R^2$=$R^3$=Me, $R^4$=$R^5$=$R^6$=$R^7$=H, n=2, [($Me_2$)N—$CH_2$—$CH_2$—$CH_2$—N(tBu)]$_2$InCl (bis-(1-tert-butylamide-2-dimethylaminopropane-N,N')Indium(III) chloride)).

Exemplary precursors having the formula [(($R^2R^3$)N—($CR^6R^7$)$_n$—C($R^4R^5$)—N($R^1$))InX]$_2$(μ—X)$_2$ include:

X=Cl, $R^1$=Me, $R^2$=$R^3$=H, $R^4$=$R^5$=$R^6$=$R^7$=H, n=1, [(($H_2$)N—$CH_2$—$CH_2$—N(Me))InCl]$_2$(μ—Cl)$_2$;

X=Cl, $R^1$=$R^2$=$R^3$=Me, $R^4$=$R^5$=$R^6$=$R^7$=H, n=1, [(($Me_2$)N—$CH_2$—$CH_2$—N(Me))InCl]$_2$(μ—Cl)$_2$; and X=Cl, $R^1$=$R^2$=$R^3$=Et, $R^4$=$R^5$=$R^6$=$R^7$=H, n=1, [(($Et_2$)N—$CH_2$—$CH_2$—N(Et))InCl]$_2$(μ—Cl)$_2$.

In the fourth embodiment, the disclosed In(III)-containing precursors contains 1 or 2μ-diketiminate ligands with the formula:

[($R^1$)N═C($R^3$)═C($R^4$)═C($R^5$)═N($R^2$)]In$X_2$,

[($R^1$)N═C($R^3$)═C($R^4$)═C($R^5$)═N($R^2$)]$_2$InX, or

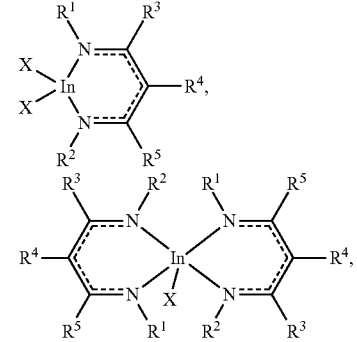

where X is a halogen, preferably chlorine. $R^1$, $R^2$, $R^3$, $R^4$ and $R^5$ are each independently selected from a linear, branched or cyclic $C_1$ to $C_9$ alkyl, vinyl or aryl groups; $R^1$, $R^2$, $R^3$, $R^4$ and $R^5$ may also be —$SiR^6R^7R^8$ where $R^6$, $R^7$, $R^8$ are each independently selected from a linear, branched or cyclic $C_1$ to $C_9$ alkyl, vinyl or aryl group. Groups $R^1$, $R^2$, $R^3$ and $R^5$ may also be selected from fluorinated linear or aromatic groups (e.g., $CF_3$, m-($CF_3$)$_2$—$C_6H_3$, etc.). Group $R^4$ may also be selected from halogens, such as F.

Exemplary precursors having the formula [($R^1$)N═C($R^3$)═C($R^4$)═C($R^5$)═N($R^2$)]In$X_2$ include:

X=Cl, $R^1$=$R^2$=$R^3$=$R^5$=Me, $R^4$=H, [(Me)N═C(Me)═CH═C(Me)═N(Me)]In$Cl_2$ ([N,N'-(1,3-dimethyl-1,3-propanediylidene)bis[methanaminato]indium(III) chloride);

X=Cl, $R^1$=$R^2$=Me, $R^3$=$R^5$=$CF_3$, $R^4$=H, [(Me)N═C(Me)═CH═C(Me)═N(Me)]In$Cl_2$ ([N,N'-(1,3-bis(trifluoromethyl)-1,3-propanediylidene)bis[methanaminato]indium(III) chloride);

X=Cl, $R^1$=$R^2$=Ph $R^3$=$R^5$=Me, $R^4$=H, [(Ph)N═C(Me)═CH═C(Me)═N(Ph)]In$Cl_2$([N,N'-(1,3-dimethyl-1,3-propanediylidene)bis[benzenaminato]indium(III) chloride);

X=Cl, $R^1$=$R^2$=iPr, $R^3$=$R^5$=Me, $R^4$=H, [(iPr)N═C(Me)═CH═C(Me)═N(iPr)]In$Cl_2$ ([N,N'-(1,3-dimethyl-1,3-propanediylidene)bis[isopropylaminato]indium(III) chloride); and X=Cl, $R^1$=$R^2$=tBu, $R^3$=$R^5$=Me, $R^4$=H, [(tBu)N═C(Me)═CH═C(Me)═N(tBu)]In$Cl_2$ ([N,N'-(1,3-dimethyl-1,3-propanediylidene)bis[tert-butylaminato]indium(III) chloride).

Exemplary precursors having the formula [($R^1$)N═C($R^3$)═C($R^4$)═C($R^5$)═N($R^2$)]$_2$InX include:

X=Cl, $R^1$=$R^2$=$R^3$=$R^5$=Me, $R^4$=H, [(Me)N═C(Me)═CH═C(Me)═N(Me)]$_2$InCl (bis-[N,N'-(1,3-dimethyl-1,3-propanediylidene)bis[methanaminato]indium(III) chloride);

X=Cl, $R^1$=$R^2$=Ph, $R^3$=$R^5$=Me, $R^4$=H, [(Ph)N═C(Me)═CH═C(Me)═N(Ph)]$_2$InCl (bis-[N,N'-(1,3-dimethyl-1,3-propanediylidene)bis[benzenaminato]indium(III) chloride);

X=Cl, R¹=R²=iPr, R³=R⁵=Me, R⁴=H, [(iPr)N⸗C(Me)⸗CH⸗C(Me)⸗N(iPr)]₂InCl (bis-[N,N'-(1,3-dimethyl-1,3-propanediylidene)bis[isopropylaminato]indium(III) chloride); and X=Cl, R¹=R²=tBu, R³=R⁵=Me, R⁴=H, [(tBu)N⸗C(Me)⸗CH⸗C(Me)⸗N(tBu)]₂InCl (bis-[N,N'-(1,3-dimethyl-1,3-propanediylidene)bis[tert-butylaminato]indium(III) chloride).

In the fifth embodiment, the disclosed In(III)-containing precursors contains a silyl amine ligand with the following formula:

[N((SiR¹R²R³)R⁴)]InX₂ or

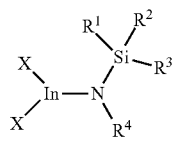

where X is chosen from chlorine, bromine and iodine, preferably chlorine; R¹, R², and R³ are each independently selected from hydrogen or a linear, branched or cyclic $C_1$ to $C_9$ alkyl, vinyl or aryl groups, R⁴ is hydrogen or a linear, branched or cyclic $C_1$ to $C_9$ alkyl, vinyl or aryl group or a —SiR⁵R⁸R⁷ group wherein R⁵, R⁶, and R⁷ are each independently selected from hydrogen or a linear, branched or cyclic $C_1$ to $C_9$ alkyl, vinyl or aryl group.

Exemplary precursors having the formula [N((SiR¹R²R³)R⁴)]InX₂ include:

X=Cl, R¹=R²=R³=Me, R⁴=H, [N((SiMe₃)H)]InCl₂ (trimethylsilyl)amino)indium(III) dichloride;

X=Cl, R¹=R²=R³=Et, R⁴=H, [N((SiEt₃)H)]InCl₂ (triethylsilyl)amino)indium(III) dichloride; and X=Cl, R¹=R²=Me, R³=H, R⁴=SiHMe₂, [N(SiMe₂H)₂]InCl₂ (bis(dimethylsilyl)amino)indium(III) chloride.

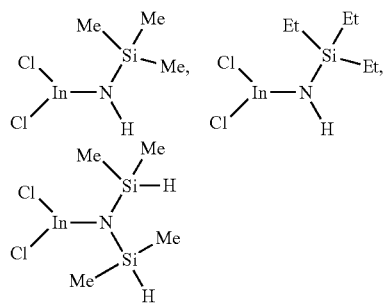

More preferably, the disclosed In(III)-containing precursor is [(Et)N⸗C(Me)⸗N(tBu)]In(III)Cl₂ having the following structure:

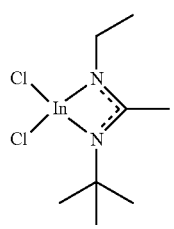

The disclosed In(III)-containing precursor is [(iPr)N⸗CH⸗N(iPr)]In(III)Cl₂ or [((iPr)N⸗C(H)⸗N(iPr))InCl₂(μ—Cl)₂ depending on the given conditions having the following structure.

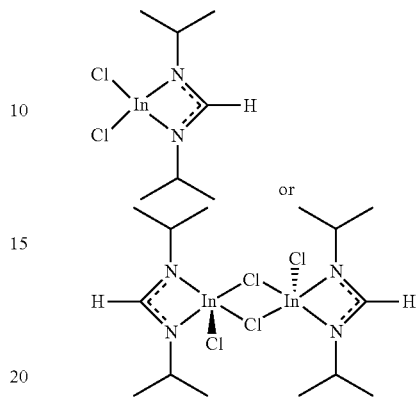

The disclosed In(III)-containing precursor is [(Et)N⸗C(nBu)⸗N(tBu)]In(III)Cl₂ having the following structure.

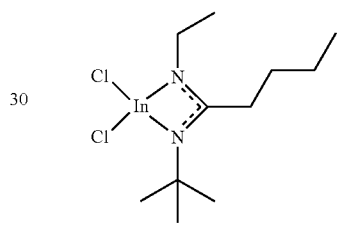

The disclosed In(III)-containing precursor is [(iPr)N⸗C(nBu)⸗N(iPr)]In(III)Cl₂ having the following structure.

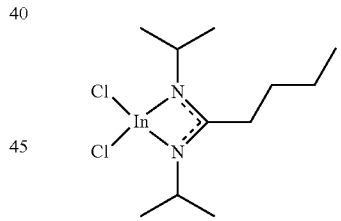

The disclosed In(III)-containing precursor is [(iPr)N⸗C(Me)⸗N(iPr)]In(III)Cl₂ having the following structure.

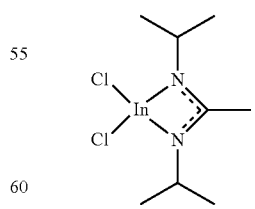

The vapor pressure of [(Et)N⸗C(Me)⸗N(tBu)]In(III)Cl₂ is 1 torr at 145° C. The vapor pressure of [(iPr)N⸗CH⸗N(iPr)]In(III)Cl₂ is 1 torr at 128° C. The vapor pressure of [(iPr)N⸗C(nBu)⸗N(iPr)]In(III)Cl₂ is 1 torr at 155° C. The vapor pressure of [(iPr)N⸗C(Me)⸗N(iPr)]In(III)Cl₂ is 1 torr at 127° C. See Table 1.

TABLE 1

In(III)-containing precursors

| In(III) precursor | Structure | DSC (Endotherms) | Vacuum TGA | Temperature (1 torr VP) |
|---|---|---|---|---|
| [(Et)N=C(Me)=N(tBu)]In(III)Cl$_2$ | | 89° C. and 303° C. | <3% residue at 220° C. | 145° C. |
| [(iPr)N=CH=N(iPr)]In(III)Cl$_2$ or [((iPr)N=C(H)=N(iPr))InCl]$_2$(μ-Cl$_2$) | | 91° C. and 284° C. | <5% residue at 210° C. | 128° C. |
| [(iPr)N=C(nBu)=N(iPr)]In(III)Cl$_2$ | | 296° C. | <3% residue at 250° C. | 155° C. |
| [(iPr)N=C(Me)=N(iPr)]In(III)Cl$_2$ | | 101° C. and 303° C. | <5% residue at 200° C. | 127° C. |
| InCl$_3$ | | 456° C. | <3% residue at 400° C. | (310° C.) |

The disclosed methods for syntheses of the disclosed In(III)-containing precursors include a salt metathesis reaction as shown in examples that follow. The disclosed In(III)-containing precursors may be synthesized through the salt metathesis reaction by mixing either one or two equivalents of a lithiated ligand with InX$_3$ where X=Cl, Br, I. The reaction is performed by loading a reaction flask with a desired nitrogen ligand in an ethereal solvent and cooling to 0° C. or −78° C. A required alkyllithium reagent is added to generate the reactive lithiated species of the ligand. The lithiated ligand is then transferred to a suspension of the desired In(III) halide in an ethereal solvent at −78 or 0° C. The reaction is allowed to stir for 12 hours. The solution is then filtered using Celite as a filtering agent, followed by a removal of solvent in vacuo to isolate the product. In the case of lithiated amidinate ligands (e.g., Li[(R$^1$)N═C(R$^3$)═N(R$^2$)] the desired starting material is the corresponding carbodiimide [(R$^1$)N═C═N(R$^2$)] and the alkyllithium reagent is LiR$^3$.

The disclosed methods for syntheses of the disclosed In(III)-containing precursors include a ligand exchange reaction of In(III)Cl with the generation of SiR$^3$—X as shown in the example below.

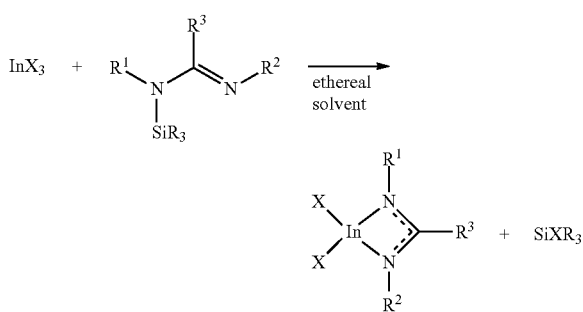

The disclosed In(III)-containing precursors may be synthesized through the ligand exchange reaction by mixing either one or two equivalents of the silylated ligand with InX$_3$ where X=H Cl, Br, I. The reaction is performed by loading a reaction flask with the desired In(III) halide In an ethereal solvent at room temperature. The required silylated nitrogen ligand is added to the reaction at room temperature and allowed to stir for 2 to 12 hours. The solvent in removed in vacuo to isolate the product followed by extraction in a hydrocarbon solvent to remove any remaining Indium(III) halide.

The disclosed In(III)-containing precursors may have the following features that make them suitable for indium and indium alloy film deposition. In one aspect, the disclosed In(III)-containing precursors have heteroleptic nature and nitrogen ligand scaffolding that render the disclosed In(III)-containing precursors much more volatile than indium trichloride (InCl$_3$) with sufficient vapor pressures at lower temperatures. In another aspect, the presence of the halogen (e.g., chloride) containing ligands in the disclosed In(III)-containing precursors allows for the use of dehalosilylation chemistries to achieve ALD at low temperatures from room temperature to 500° C., preferably 100° C.-400° C. The disclosed In(III)-containing precursors represent a potential new product line in semiconductor industry.

The disclosed In(III)-containing precursors may have high thermal stability and may be used for forming high-speed, high sensitivity semiconductor layers, e.g. in CMOS systems, 3D NAND Channel or in photodetectors. The disclosed In(III)-containing precursors and the disclosed film forming compositions are suitable to deposit the corresponding element-containing films and its related use for deposition of the corresponding element-containing layers.

The disclosed In(III) precursors and the disclosed film forming compositions are suitable for forming indium-containing thin films, such as InGaAs, In$_x$O$_y$, (0.5-1.5, y=0.5-1.5), InSnO (ITO), InGaZnO (IGZO), InN, InP, InAs, InSb, In$_2$S$_3$, etc. used in electronic fields. The disclosed In(III) precursors and the disclosed film forming compositions are useful for the fabrication of indium tin oxide in displays, solar fuel, high speed electronic (InN), optoelectronic components, high-speed electronics, photovoltaics (InP), infrared detectors, diode laser (InAs), fast transistors, magnetic field, thermal image detectors (InSb), photoelectronic devices, photoelectrochemical water splitting (In$_2$S$_3$), LED applications, the fabrication of copper indium gallium selenide (CIGS) in photovoltaics and optical applications, indium gallium zinc oxide (IGZO) in displays, semiconductors, Logic and memories industries, and the like.

The disclosure also includes processes for forming an Indium-containing film and methods for forming an oxygenated or oxygen-free indium-containing film using the disclosed In(III) precursors by vapor deposition methods, such as ALD or CVD. The disclosed are a deposition process where the disclosed In(III) precursors are used and introduced into a reaction chamber for deposition a film by ALD, CVD, spin-on, spray, dip coating, slit coating or any other deposition technique to form a film, in combination with or without one or more oxidants (for example O$_2$ and O$_3$, or H$_2$O and O$_3$), or with one or more reductants or nitriding agents (for example H$_2$ and NH$_3$, N$_2$ and NH$_3$, or NH$_3$ and N$_2$H$_4$) introduced simultaneously and/or sequentially. The disclosed deposition processes using the disclosed In(III) precursors may be assisted by heating, light, direct or remote plasma, or combination thereof.

When the target is a dielectric film, the co-reactant may be an oxidizing gas such as one of O$_2$, O$_3$, H$_2$O, H$_2$O$_2$, NO, N$_2$O, NO$_2$, oxygen containing radicals such as O— or OH—, alcohol, silanols, aminoalcohols, carboxylic acids such as formic acid, acetic acid, propionic acid, para-formaldehyde, other oxidizing compounds and mixtures thereof. Preferably, the oxidizing gas is selected from the group consisting of O$_2$, O$_3$, H$_2$O$_2$, and H$_2$O. Preferably, when an ALD process is performed, the co-reactant is plasma treated oxygen, ozone, or combinations thereof. When an oxidizing agent is used as the co-reactant, the resulting In(III)-containing film will also contain oxygen.

When the target is a conductive film, the co-reactant may be NH$_3$, N$_2$, H$_2$ or N$_2$/H$_2$, amines, diamines, cyanides, di-imines, hydrazines (for example, N$_2$H$_4$, MeHNNH$_2$, MeHNNHMe), organic amines (for example, H$_2$N(CH$_3$), H$_2$N(CH$_2$CH$_3$), H$_2$NC(CH$_3$)$_3$, N(CH$_3$)H$_2$, N(C$_2$H$_5$)H$_2$, N(CHs)$_2$H, N(C$_2$H$_5$)$_2$H, N(CH$_3$)$_3$, N(C$_2$H$_5$)$_3$, (SiMe$_3$)$_2$NH), pyrazoline, pyridine, radical and plasma species, and mixtures thereof. The co-reactant may be a primary amine, a secondary amine, a tertiary amine, trisilylamine, radicals thereof, and mixtures thereof. Preferably, the co-reactant is NH$_3$ or H$_2$. When a N-containing reducing agent is used, the resulting In(III)-containing film will also contain nitrogen.

When the desired In(III)-containing film also contains another element, for example and without limitation, P, Ga, As, B, Ge, Ta, Hf, Nb, Mg, Al, Sr, Y, Ba, Ca, Sb, Bi, Sn, Pb, Co, lanthanides (such as Er), or combinations thereof, the co-reactants may include another precursor.

Furthermore, the co-reactant may be treated by a plasma, in order to decompose the reactant into its radical form, at least one of H$_2$, N$_2$ and O$_2$ may be utilized as a hydrogen, nitrogen or oxygen source gas, respectively, when treated with plasma. The plasma source may be a N$_2$ plasma, N$_2$/He plasma, N$_2$/Ar plasma, NH$_3$ plasma, NH$_3$/He plasma, NH$_2$/Ar plasma, He plasma, Ar plasma, H$_2$ plasma, H$_2$/He plasma, H$_2$/organic amine plasma, and mixtures thereof. For instance, the plasma may be generated with a power ranging from about 10 W to about 1000 W, preferably from about 50 W to about 500 W. The plasma may be generated present within the reactor itself. Alternatively, the plasma may generally be at a location removed from the reactor, for instance, in a remotely located plasma system. One of skill in the art will recognize methods and apparatus suitable for such plasma treatment.

For example, the co-reactant may be introduced into a direct plasma reactor, which generates plasma in the reaction chamber, to produce the plasma-treated reactant in the reaction chamber. The co-reactant may be introduced and held in the reaction chamber prior to plasma processing. Alternatively, the plasma processing may occur simultaneously with the introduction of the reactant.

Alternatively, the plasma-treated co-reactant may be produced outside of the reaction chamber, for example, a remote plasma to treat the co-reactant prior to passage into the reaction chamber.

Also disclosed are methods for forming indium (III)-containing layers on a substrate using a vapor deposition process. Applicants believe that the disclosed film forming compositions are suitable for ALD. More particularly, the disclosed film forming compositions are capable of surface saturation, self-limited growth per cycle, and perfect step coverage on aspects ratios ranging from approximately 2:1 to approximately 200:1, and preferably from approximately 60:1 to approximately 150:1. Additionally, the disclosed film forming compositions have high decomposition temperatures, indicating good thermal stability to enable ALD. The high decomposition temperatures permit ALD at higher temperatures, resulting in films having higher purity. The disclosed methods may be useful in the manufacture of semiconductor, photovoltaic, LCD-TFT, flat panel type devices.

The disclosed In(III)-containing film forming compositions may be used to deposit In(III)-containing films using any deposition methods known to those of skill in the art. Examples of suitable deposition methods include chemical vapor deposition (CVD) or atomic layer deposition (ALD) with or without plasma enhancement. Exemplary ALD methods include thermal ALD, plasma enhanced ALD (PEALD), spatial isolation ALD, temporal ALD, selective or not ALD, hot-wire ALD (HWALD), radicals incorporated ALD, and combinations thereof. The deposition method is preferably ALD, PE-ALD, or spatial ALD in order to provide suitable step coverage and film thickness control. Exemplary CVD methods include metal-organic CVD (MOCVD), thermal CVD, pulsed CVD (PCVD), low pressure CVD (LPCVD), sub-atmospheric CVD (SACVD) or atmospheric pressure CVD (APCVD), hot-wire CVD or hot filament CVD (also known as cat-CVD, in which a hot wire serves as an energy source for the deposition process), hot wall CVD, cold wall CVD, aerosol assisted CVD, direct liquid injection CVD, combustion CVD, hybrid physical-CVD, metalorganic CVD, rapid thermal CVD, photo-initiated CVD, laser CVD, radicals incorporated CVD, plasma enhanced CVD (PECVD) including but not limited to flowable PECVD, and combinations thereof.

The disclosed In(III)-containing film forming composition contains less than 5% v/v, preferably less than 1% v/v, more preferably less than 0.1% v/v, and even more preferably less than 0.01% v/v of any of its analogs or other reaction products. This embodiment may provide better process repeatability. This embodiment may be produced by purification (e.g., distillation, sublimation, chromatography, etc.) of the In(III)-containing film forming composition.

Purity of the disclosed film forming composition is greater than 93% w/w (i.e., 95.0% w/w to 100.0% w/w), preferably greater than 98% w/w (i.e., 98.0% w/w to 100.0% w/w), and more preferably greater than 99% w/w (i.e., 99.0% w/w to approximately 99.999% w/w or 99.0% w/w to 100.0% w/w). One of ordinary skill in the art will recognize that the purity may be determined by NMR spectroscopy and gas or liquid chromatography with mass spectrometry. The disclosed film forming compositions may contain any of the following impurities: pyrazoles; pyridines; alkylamines; alkylimines; THF; ether; pentane; cyclohexane; heptanes; benzene; toluene; chlorinated metal compounds; lithium, sodium, potassium pyrazolyl. The total quantity of these impurities is preferably below 5% w/w (i.e., 0.0% w/w to 5.0% w/w), preferably below 2% w/w (i.e., 0.0% w/w to 2.0% w/w), and more preferably below 1% w/w (i.e., 0.0% w/w to 1.0% w/w). The disclosed film forming composition may be purified by recrystallization, sublimation, distillation, and/or passing the gas liquid through a suitable adsorbent, such as 4A molecular sieves.

Purification of the disclosed film forming composition may also result in metal impurities each range independently at the 0 ppbw to 1 ppmw, preferably approximately 0 to approximately 500 ppbw (part per billion weight) level, more preferably from approximately 0 ppbw to approximately 100 ppbw, and even more preferably from approximately 0 ppbw to approximately 10 ppbw. These metal or metalloid impurities include, but are not limited to, Aluminum(Al), Arsenic(As), Barium(Ba), Beryllium(Be), Bismuth(Bi), Cadmium(Cd), Calcium(Ca), Chromium(Cr), Cobalt(Co), Copper(Cu), Gallium(Ga), Germanium(Ge), Hafnium(Hf), Zirconium(Zr), Iron(Fe), Lead(Pb), Lithium(Li), Magnesium(Mg), Manganese(Mn), Tungsten(W), Nickel(Ni), Potassium(K), Sodium(Na), Strontium(Sr), Thorium(Th), Tin(Sn), Titanium(Ti), Uranium(U), Vanadium(V) and Zinc(Zn).

Care should be taken to prevent exposure of the disclosed In(III)-containing film forming compositions to water as this may result in decomposition of the In(III)-containing precursors to an indium oxide (e.g., $In_2O_3$).

The disclosed film forming compositions may be supplied either in neat form or in a blend with a suitable solvent, such as ethyl benzene, xylene, mesitylene, decalin, decane, dodecane. The disclosed precursors may be present in varying concentrations in the solvent.

The neat blended film forming compositions are introduced into a reactor in a vapor form by conventional means, such as tubing and/or flow meters. The vapor form may be produced by vaporizing the neat blended composition through a conventional vaporization step such as direct vaporization, distillation, by bubbling, or by using a sublimator, such as the one disclosed in PCT Publication WO2009/087609 to Xu et al. The neat blended composition may be fed in liquid state to a vaporizer where it is vaporized before it is introduced into the reactor. Alternatively, the neat blended composition may be vaporized by passing a carrier gas into a container containing the composition by bubbling the carrier gas into the composition. The carrier gas may include, but is not limited to, Ar, He, $N_2$, and mixtures thereof. Bubbling with a carrier gas may also remove any dissolved oxygen present in the neat blended composition. The carrier gas and composition are then introduced into the reactor as a vapor, If necessary, the container containing the disclosed film forming composition may be heated to a temperature that permits the composition to have a sufficient vapor pressure. The container may be maintained at temperatures in the range of, for example, approximately 0° C. to approximately 200° C. Those skilled in the art recognize that the temperature of the container may be adjusted in a known manner to control the amount of precursor vaporized.

The reactor may be any enclosure chamber within a device in which deposition methods take place such as without limitation, a parallel-plate type reactor, a cold-wall type reactor, a hot-wall type reactor, a single-wafer reactor, a multi-wafer reactor, other types of deposition systems under conditions suitable to cause the compounds to react and form the layers. One of ordinary skill in the art will recognize that any of these reactors may be used for either ALD or CVD deposition processes.

The reactor contains one more substrates onto which the films will be deposited. A substrate is generally defined as the material on which a process is conducted. The substrates may be any suitable substrate used in semiconductor, photovoltaic, flat panel, LCD-TFT device manufacturing. Examples of suitable substrates include wafers, such as silicon, silica, glass, GaAs wafers. The wafer may have one more layers of differing materials deposited on it from a previous manufacturing step. For example, the wafers may include a dielectric layer. Furthermore, the wafers may include silicon layers (crystalline, amorphous, porous, etc.), silicon oxide layers, silicon nitride layers, silicon oxy nitride layers, carbon doped silicon oxide (SiCOH) layers, metal, metal oxide metal nitride layers (Ti, Ru, Ta, etc.), and combinations thereof. Additionally, the wafers may include copper layers noble metal layers (e.g., platinum, palladium, rhodium, gold). The wafers may include barrier layers, such as manganese, manganese oxide, etc. Plastic layers, such as poly(3,4-ethylenedioxythiophene)poly(styrenesulfonate) [PEDOT:PSS] may also be used. The layers may be planar or patterned. The disclosed processes may deposit the layer directly on the wafer or directly on one or more layers on top of the wafer when patterned layers are formed on the substrate. The pattered layers may be alternating layers of two specific layers such as $In_2O_3$ and $ZrO_2$ used in 3D NAND. Furthermore, one of ordinary skill in the art will recognize that the terms "film" "layer" used herein refer to a thickness of some material laid on or spread over a surface and that the surface may be a trench a line. Throughout the specification and claims, the wafer and any associated layers thereon are referred to as substrates. For example, an indium oxide film may be deposited onto a metal oxide layer, such as a $ZrO_2$ layer, an $HfO_2$ layer, or a $MoO_2$ layer.

The substrate final application is not limited to the present invention, but this technology may find particular benefits for the following types of substrates: silicon wafers, glass wafers and panels, beads, powders and nano-powders, monolithic porous media, printed circuit board, plastic sheets, etc. Exemplary powder substrates include a powder used in rechargeable battery technology. A non-limiting number of powder materials include NMC (Lithium Nickel Manganese Cobalt Oxide), LCO (Lithium Cobalt Oxide), LFP (Lithium Iron Phosphate), and other battery cathode materials.

The temperature and the pressure within the reactor are held at conditions suitable for vapor depositions, such as ALD and CVD. In other words, after introduction of the vaporized disclosed film forming composition into the chamber, conditions within the chamber are such that at least part of the precursor is deposited onto the substrate to form a layer. For instance, the pressure in the reactor or the deposition pressure may be held between about $10^{-3}$ torr and about 100 torr, more preferably between about $10^{-2}$ torr and 10 torr, as required per the deposition parameters. Likewise, the temperature in the reactor or the deposition temperature may be held between about 100° C. and about 600° C., preferably between about 150° C. and about 500° C. One of ordinary skill in the art will recognize that "at least part of the precursor is deposited" means that some all of the precursor reacts with adheres to the substrate.

The temperature to achieve optimal film growth may be controlled by either controlling the temperature of the substrate holder. Devices used to heat the substrate are known in the art. The substrate is heated to a sufficient temperature to obtain the desired film at a sufficient growth rate and with desired physical state and composition. A non-limiting exemplary temperature range to which the substrate may be heated includes from approximately 50° C. to approximately 600° C. When a plasma deposition process is utilized, the deposition temperature is preferably less than 400° C. Alternatively, when a thermal process is performed, the deposition temperature may range from approximately 100° C. to approximately 600° C.

Alternatively, the substrate may be heated to a sufficient temperature to obtain the desired In(III)-containing film at a sufficient growth rate and with desired physical state and composition. A non-limiting exemplary temperature range to which the substrate may be heated includes from room temperature to approximately 600° C. Preferably, the temperature of the substrate remains less than or equal to 500° C.

The ALD conditions within the chamber allow the disclosed film forming composition adsorbed or chemisorbed on the substrate surface to react and form a film on the substrate. In some embodiments, Applicants believe that plasma-treating the co-reactant may provide the co-reactant with the energy needed to react with the disclosed film forming composition. When the co-reactant in this exemplary ALD process is treated with a plasma, the exemplary ALD process becomes an exemplary PEALD process. The co-reactant may be treated with plasma prior subsequent to introduction into the chamber.

The film forming composition and co-reactants may be introduced into the reactor sequentially (ALD). The reactor may be purged with an inert gas between the introduction of each of the film forming composition, any additional precursors, and the co-reactants. Another example is to introduce the co-reactant continuously and to introduce the film forming composition by pulse, while activating the co-reactant sequentially with a plasma, provided that the film forming composition and the non-activated co-reactant do not substantially react at the chamber temperature and pressure conditions (CW PEALD).

Each pulse of the disclosed film forming composition may last for a time period ranging from about 0.001 seconds to about 120 seconds, alternatively from about 1 seconds to about 80 seconds, alternatively from about 5 seconds to about 30 seconds. The co-reactant may also be pulsed into the reactor, In such embodiments, the pulse of each may last for a time period ranging from about 0.01 seconds to about 120 seconds, alternatively from about 1 seconds to about 30 seconds, alternatively from about 2 seconds to about 20 seconds. In another alternative, the vaporized film forming compositions and co-reactants may be simultaneously sprayed from different sectors of a shower head (without mixing of the composition and the reactant) under which a susceptor holding several wafers is spun (spatial ALD).

Depending on the particular process parameters, deposition may take place for a varying length of time. Generally, deposition may be allowed to continue as long as desired necessary to produce a film with the necessary properties. Typical film thicknesses may vary from several angstroms to several hundreds of microns, and typically from 1 to 100 nm, depending on the specific deposition process. The deposition process may also be performed as many times as necessary to obtain the desired film.

The disclosed methods for forming an In(III)-containing layer on a substrate include: placing a substrate in a reactor, delivering into the reactor a vapor of the disclosed In(III)-containing film forming composition, and contacting/adsorbing the vapor with the substrate (and typically directing the vapor to the substrate) to form an In(III)-containing layer on the surface of the substrate. Alternatively, the disclosed methods for forming an In(III)-containing layer on a substrate include: exposing the substrate to the vapor of the disclosed In(III)-containing film forming composition, and depositing an In(III)-containing layer on the surface of the substrate.

The vapor of the In(III)-containing film forming composition is generated and then introduced into a reaction chamber containing a substrate. The temperature and the pressure in the reaction chamber and the temperature of the substrate are held at conditions suitable for vapor deposition of at least part of the disclosed In(III)-containing precursor onto the substrate. In other words, after introduction of the vaporized composition into the reaction chamber, conditions within the reaction chamber are adjusted such that at least part of the precursor is deposited onto the substrate to form the In(III)-containing layer. One of ordinary skill in the art will recognize that "at least part of the precursor is deposited" means that some or all of the precursor reacts with or adheres to the substrate. Herein, a co-reactant may also be used to help in formation of the In(III)-containing layer.

The disclosed film forming compositions and co-reactants may be introduced into the reactor either simultaneously (CVD), sequentially (ALD) or different combinations thereof. The reactor may be purged with an inert gas (e.g., $N_2$ or Ar) between the introduction of the film forming composition and the introduction of the co-reactant. Alternatively, the co-reactant and the film forming composition may be mixed together to form a co-reactant/compound mixture, and then introduced to the reactor in a mixture form. Another example is to introduce the co-reactant continuously and to introduce the disclosed film forming composition by pulse (pulsed CVD).

In a non-limiting exemplary ALD process of forming an indium-containing film containing two elements, such as $In_2O_3$, InN, InS, etc., the vapor phase of the disclosed film forming composition, such as [(Et)N= C(Me)= N(tBu)]In(III)Cl$_2$, is introduced into the reactor, where it is contacted with a suitable substrate, either chemisorbed or physisorbed thereon. Excess composition may then be removed from the reactor by purging and/or evacuating the reactor, that is, either by purging a reactor with an inert gas (e.g., $N_2$, Ar, Kr or Xe), or passing the substrate in a sector under high vacuum and/or a carrier gas curtain. A co-reactant (e.g., $O_3$ or $NH_3$) is introduced into the reactor where it reacts with the adsorbed film forming composition in a self-limiting manner. Any excess co-reactant is removed from the reactor by purging and/or evacuating the reactor. If the desired film is an oxide, such as $In_2O_3$, this two-step process may provide the desired film thickness by repeating until a film having the desired thickness has been obtained. By alternating the provision of the indium film forming composition and co-reactant, a film of desired composition and thickness can be deposited.

Alternatively, if the desired indium-containing film contains three elements, such as InGaN, the two-step process above (for example, forming InN film) may be inserted by introduction of the vapor of an additional precursor compound into the reactor (three-step process). The additional precursor compound will be selected based on the nature of the film being deposited. The additional elements may include gallium (Ga), nitrogen (N), sulfur (S), phosphorous (P), Tin (Sn), arsenic (As), antimony (Sb), zinc (Zn), and mixtures thereof. When the additional precursor compound is utilized, the resultant film deposited on the substrate contains indium and co-reactant in combination with the additional element. When the additional precursor and the In(III) precursor are used in more than one ALD super cycle sequences, a nanolaminate film is obtained. After introduction into the reactor, the additional precursor compound is contacted or adsorbed with the substrate. Afterward, any excess precursor compound is removed from the reactor by purging and/or evacuating the reactor. Depending on process requirements, a co-reactant, such as $NH_3$, or an additional precursor may be introduced into the reactor to react with the indium precursor compound. Excess co-reactant or precursor is removed from the reactor by purging and/or evacuating the reactor. In the final steps of the cycle, the remaining co-reactant or precursor may be introduced into the reactor and removal of excess is removed by purging and/or evacuation of the reactor. The entire three-step process may be repeated until a desired film thickness has been achieved. By alternating the provision of the indium film forming composition, additional precursor compound, and co-reactant, a film of desired composition and thickness can be deposited.

Alternatively, if the desired indium-containing film contains four elements such as InGaZnO (IGZO), the three-step process above may be inserted by introduction of the vapor of another additional precursor compound into the reactor (four-step process). The other additional precursor compound will be selected based on the nature of the film being deposited. The additional elements may include gallium (Ga), nitrogen (N), sulfur (S), phosphorous (P), tin (Sn), arsenic (As), antimony (Sb), zinc (Zn), and mixtures thereof. When another additional precursor compound is utilized, the resultant film deposited on the substrate contains indium in combination with the additional three elements. When the additional two precursors and the In(III) precursor are used in more than one ALD super cycle sequences, a nanolaminate film is obtained. In case of forming IGZO films, the precursors may include an indium precursor such as [(iPr)N= CH= N(iPr)]In(III)Cl$_2$, a Ga precursor such as $GaCl_3$ or $Ga(NO_3)_3$, a Zn precursor such as $Zn(NO_3)_2$ in combination with a co-reactant $O_3$. By alternating the provision of the indium film forming composition, additional precursor compound, another additional precursor and co-reactant, a film of desired composition and thickness can be deposited.

The indium-containing films resulting from the processes discussed above may include $In_xO_y$ (x=0.5 to 1.5, y=80.5 to 1.5), InSnO (ITO), InGaZnO (IGZO), InN, InP, InAs, InSb, $In_2S_3$, or combination thereof or a pure indium (In(0)) layer. The Indium-containing films may contain a second element selected from P, N, S, Ga, As, B, Ta, Hf, Nb, Mg, Al, Sr, Y, Ba, Ca, As, Sb, Bi, Sn, Pb, Co, Zn, one or more lanthanides, or combinations thereof. One of ordinary skill in the art will recognize that by appropriate selection of the film forming composition and co-reactants, the desired film composition may be obtained. The disclosed methods may be useful in the manufacture of a semiconductor material, for example, indium oxide can serve as a semiconductor material, forming heterojunctions with p-InP, n-GaAs, n-Si, and other materials. Thin films of indium oxide can be used as diffusion barriers ("barrier metals") in semiconductors (e.g., to inhibit diffusion between aluminum and silicon).

Upon obtaining a desired film thickness, the film may be subject to further processing, such as thermal annealing, furnace-annealing, rapid thermal annealing, UV e-beam curing, and/or plasma gas exposure. Those skilled in the art recognize the systems and methods utilized to perform these additional processing steps. For example, the $In_2O_3$ film may be exposed to a temperature ranging from approximately 200° C. and approximately 1000° C. for a time ranging from approximately 0.1 second to approximately 7200 seconds under an inert atmosphere, an O-containing atmosphere, and combinations thereof. Most preferably, the temperature range is 350° C. to 450° C. for 3600-7200 seconds under an inert atmosphere or an O-containing atmosphere. The resulting film may contain fewer impurities and therefore may have an improved density resulting in improved leakage current. The annealing step may be performed in the same reaction chamber in which the deposition process is performed. Alternatively, the substrate may be removed from the reaction chamber, with the annealing/flash annealing process being performed in a separate apparatus. Any of the above post-treatment methods, but especially thermal annealing, has been found effective to reduce carbon and nitrogen contamination of the $In_2O_3$ film. This in turn tends to improve the resistivity of the film.

After annealing, the films deposited by any of the disclosed processes may have a bulk resistivity at room temperature of approximately 50 μohm·cm to approximately 1,000 μohm·cm. Room temperature is approximately 20° C. to approximately 25° C. depending on the season. Bulk resistivity is also known as volume resistivity. One of ordinary skill in the art will recognize that the bulk resistivity is measured at room temperature on the films that are typically approximately 50 nm thick. The bulk resistivity typically increases for thinner films due to changes in the electron transport mechanism. The bulk resistivity also increases at higher temperatures.

EXAMPLES

The following non-limiting examples are provided to further illustrate embodiments of the invention. However, the examples are not intended to be all inclusive and are not intended to limit the scope of the inventions described herein.

Example 1: Synthesis of [(Et)N═C(Me)═N(tBu)]In(III)Cl₂

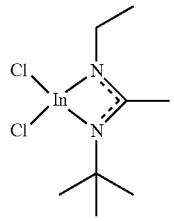

Figure 2:
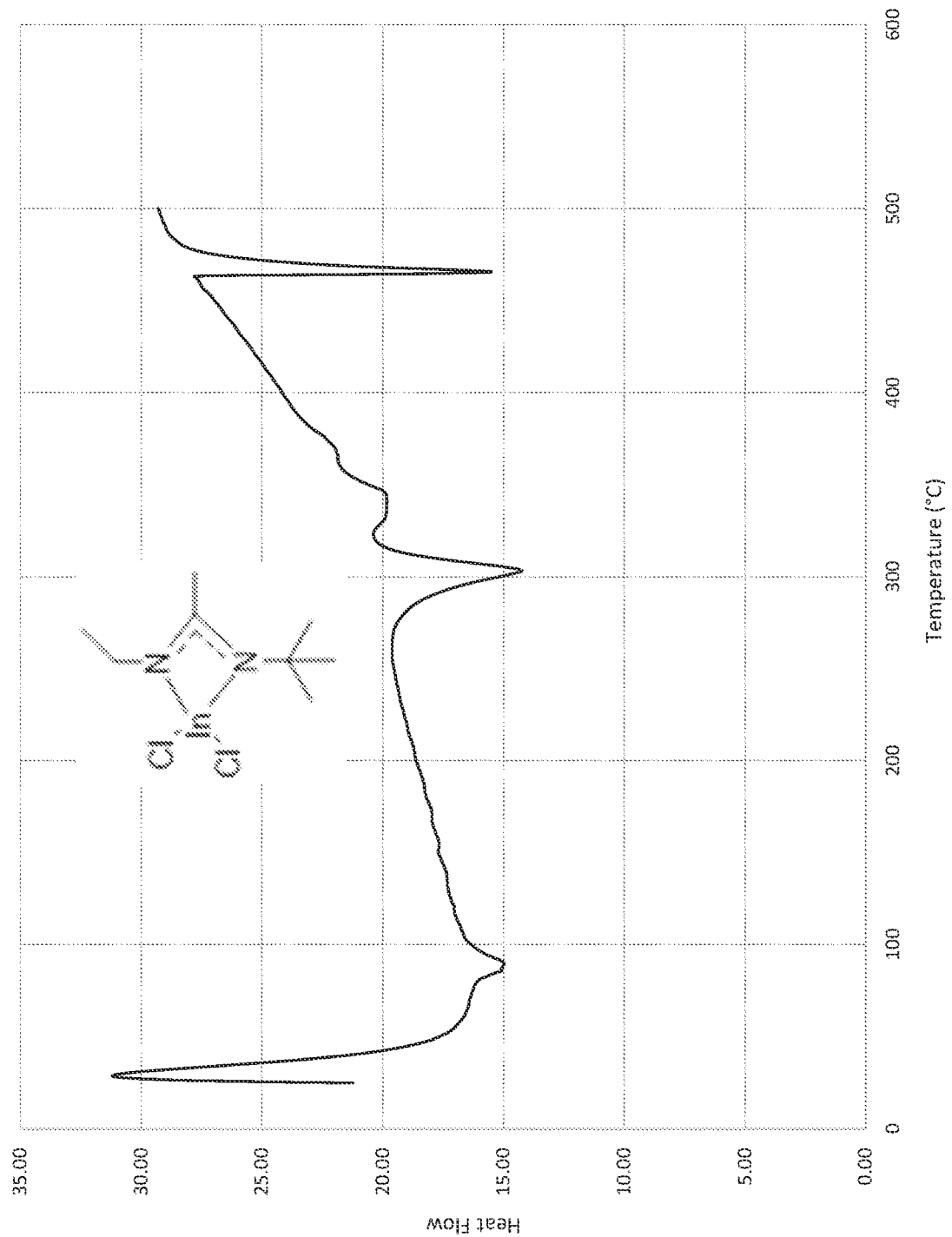
FIG. 2 is differential scanning calorimetry (DSC) results for [(Et)N═C(Me)═N(tBu)]In(III)Cl$_2$.
Figure 3:
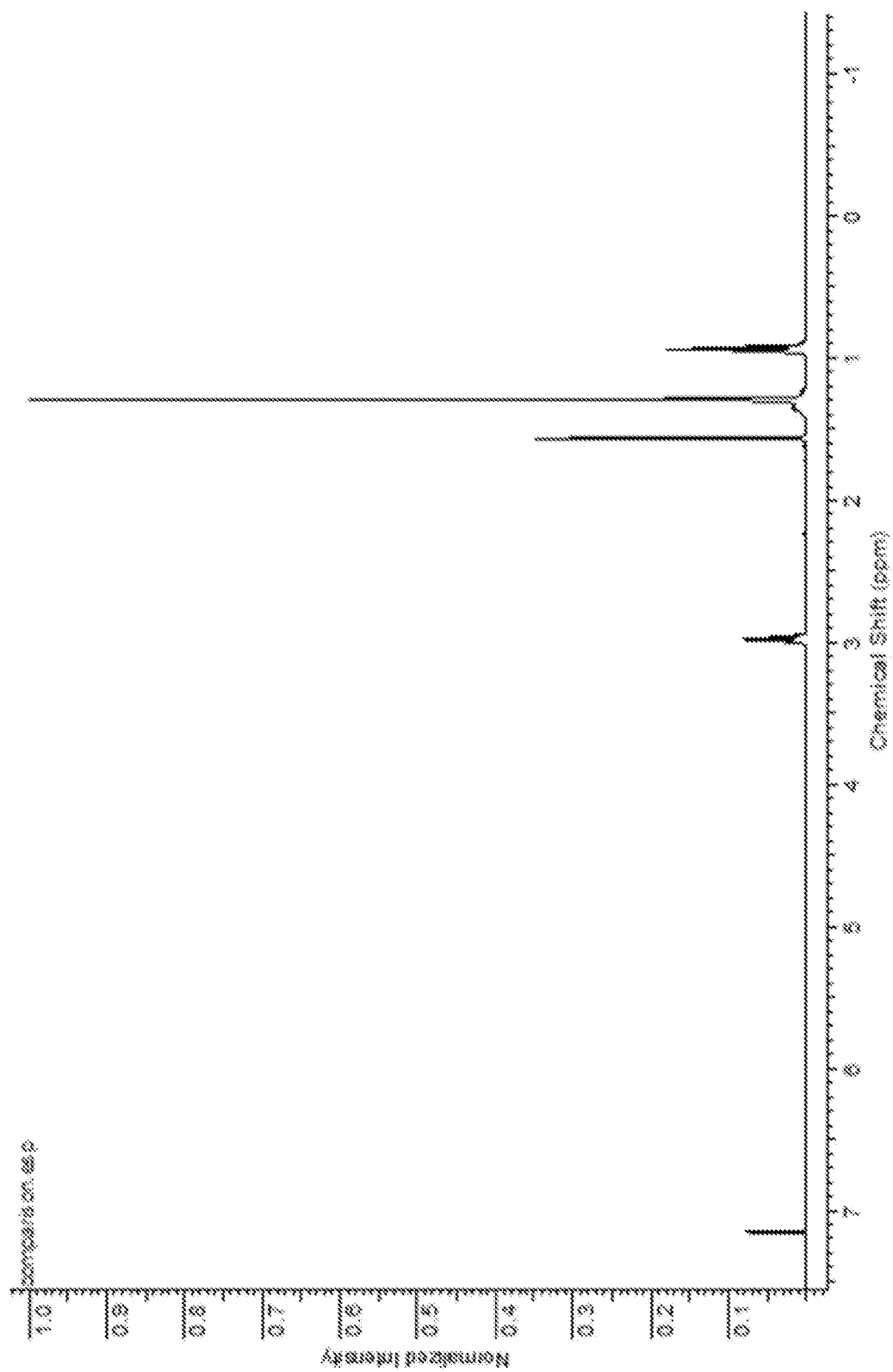
FIG. 3 is $^1$H NMR of [(Et)N═C(Me)═N(tBu)]In(III)Cl$_2$ in C$_6$D$_6$.

In a Schlenk flask under nitrogen fitted with an addition funnel, 1-tert-butyl-3-ethylcarbodiimide (0.95 equiv, 0.038 mol, 4.79 gram) was dissolved in an ethereal solvent (120 mL), preferably diethyl ether, and cooled to −78° C. Methyllithium (1.6 M, 0.97 equiv, 0.039 mol, 24.3 mL) in diethyl ether was added to the flask slowly. The mixture was allowed to stir for two hours and warmed to room temperature with stirring. In a separate Schleck flask a suspension of indium (III) chloride (1.0 equiv, 0.040 mol, 8.87 g) in an ethereal solvent (200 mL), preferably dimethoxyethane, was cooled to −78° C. The lithium solution was slowly added to the suspension, and the reaction was allowed to warm to room temperature and was stirred for 12 hours. At which time the solvent was removed under reduced vacuum followed by the addition of 250 mL of pentane. The reaction was filtered through Celite, and the volume was reduced under vacuum. The remaining solution was cooled, and the desired product crystalized out of solution at −20° C. The product [(Et)N═C(Me)═N(tBu)]In(III)Cl₂ was isolated (5.84 gram, 45% yield) as a white solid which melted at 88° C. ¹H-NMR (benzene-d₆, δ (ppm): 0.94 (3H, t, 7.2 Hz), 1.30 (9H, s), 1.57 (3H, s), 3.29 (2H, q, 7.0 Hz). The vacuum TGA results for [(Et)N═C(Me)═N(tBu)]In(III)Cl₂ is shown in FIG. 1, which shows single step evaporation with <3% residue remaining at 220° C. for [(Et)N═C(Me)═N(tBu)]In(III)Cl₂. For a comparison purpose, the vacuum TGA result for InCl₃ is also added. As shown, volatility of [(Et)N═C(Me)═N(tBu)]In(III)Cl₂ precursor increases relative to that of InCl₃. The DSC results for [(Et)N═C(Me)═N(tBu)]In(III)Cl₂ is shown in FIG. 2. [(Et)N═C(Me)═N(tBu)]In(III)Cl₂ has a vapor pressure of 1 torr at 145° C. FIG. 3 is ¹H NMR of [(Et)N═C(Me)═N(tBu)]In(III)Cl₂ in C₆D₆.

Example 2: Synthesis of [(iPr)N═CH═N(iPr)]In(III)Cl₂ or [((iPr)N═C(H)═N(iPr))InCl]₂(μ—Cl)₂

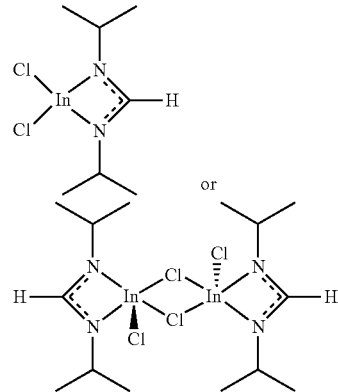

Figure 4:
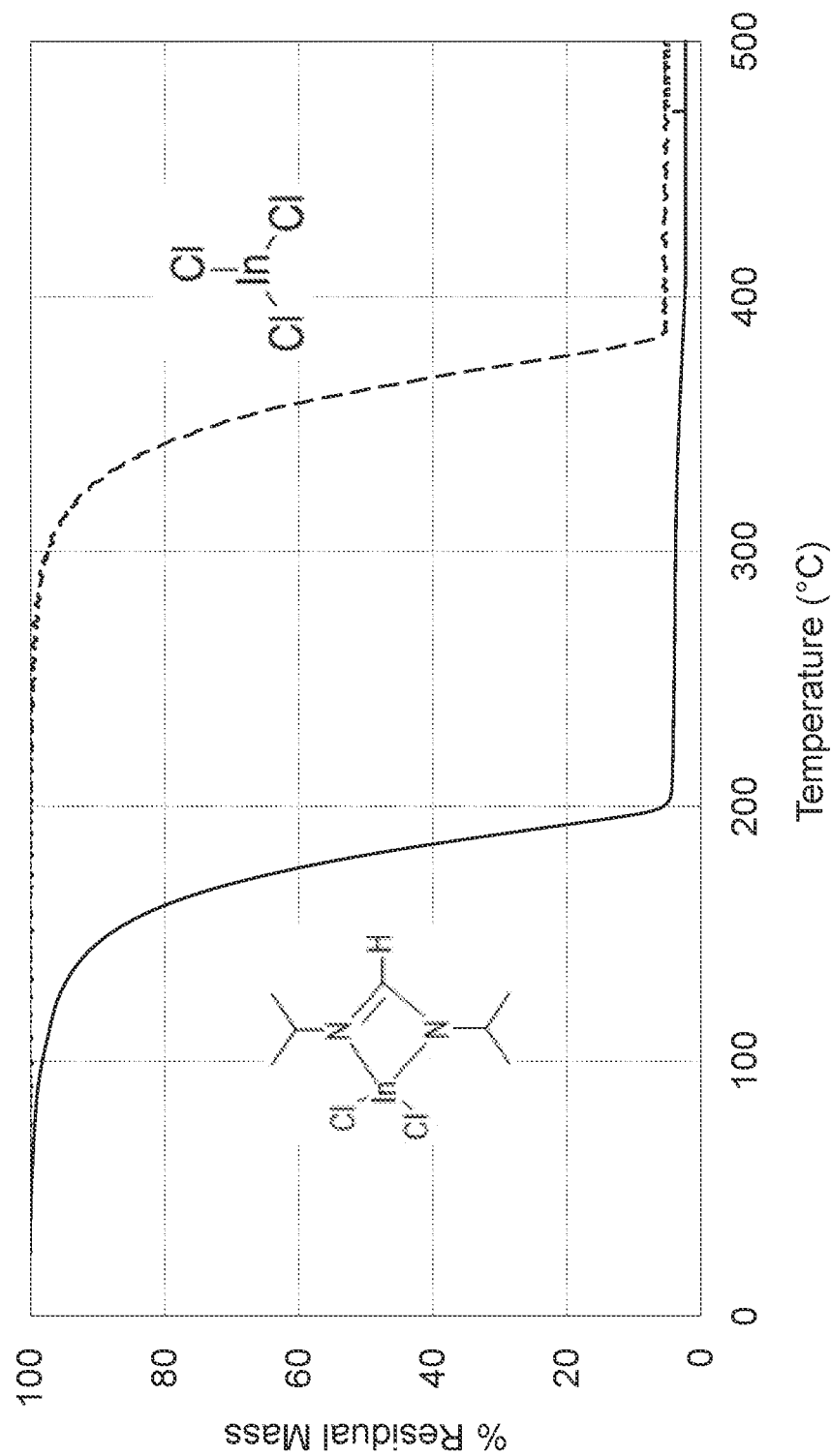
FIG. 4 is TGA results of [(iPr)N═CH═N(iPr)]In(III)Cl$_2$.
Figure 5:
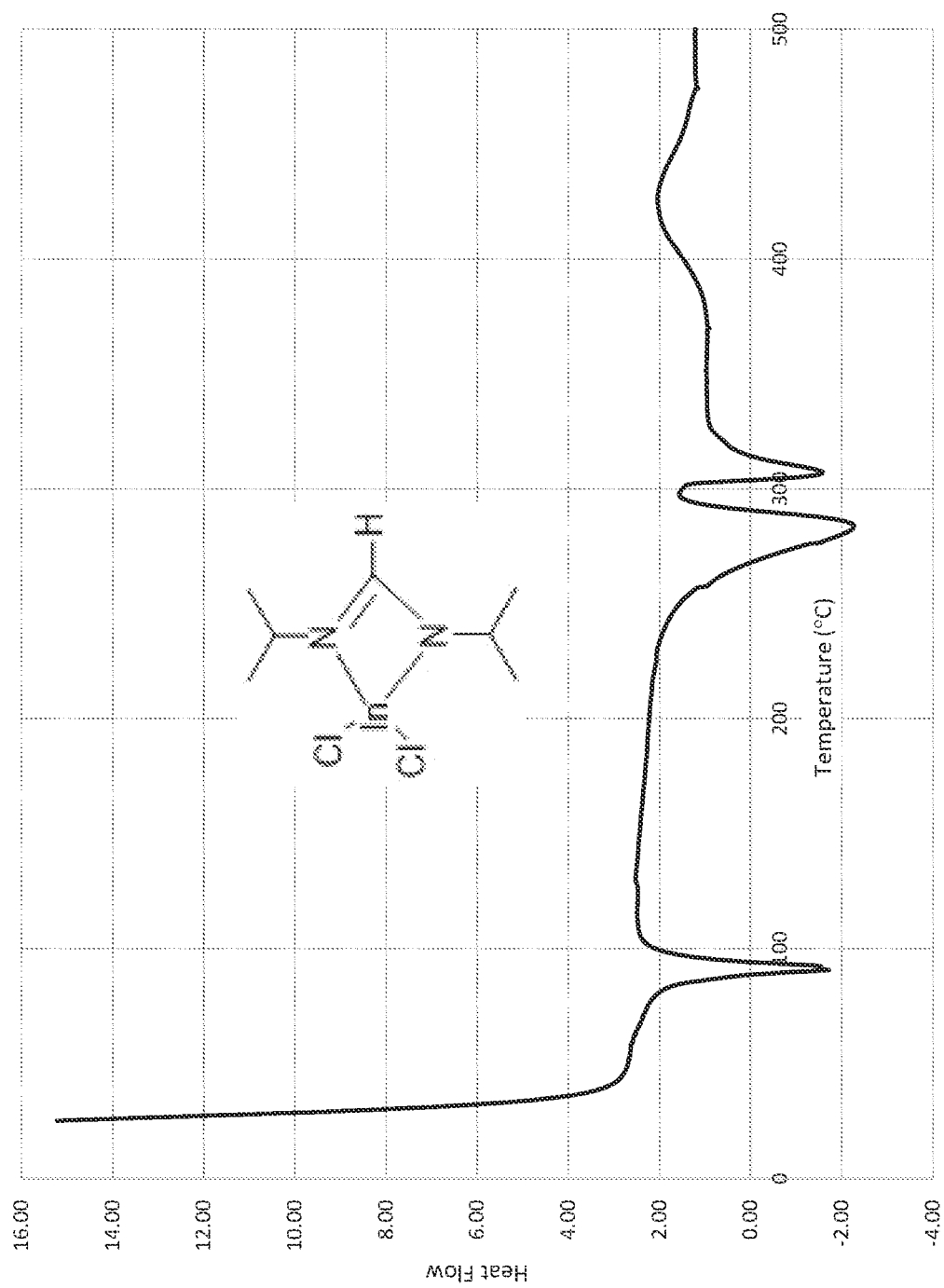
FIG. 5 is DSC results of [(iPr)N═CH═N(iPr)]In(III)Cl$_2$.
Figure 6:
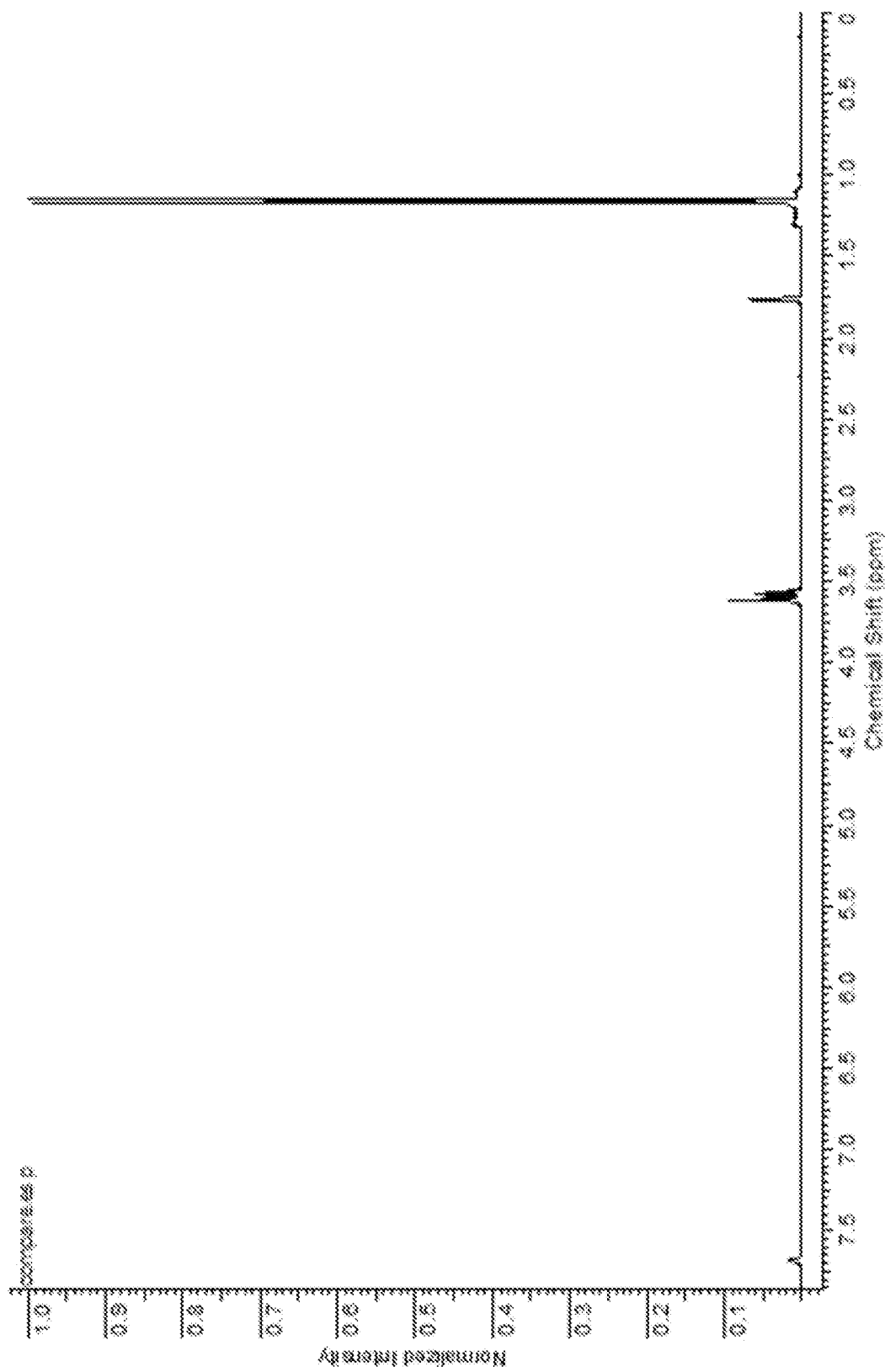
FIG. 6 is $^1$H NMR of [(iPr)N═CH═N(iPr)]In(III)Cl$_2$ in THF-d$_8$.

The same procedure was followed for Example 1. Reagents used were N,N'-bis(1-methylethyl)methanimidamide (0.95 equiv, 0.039 mol, 5.00 g) methyllithium (0.97 equiv, 0.040 mol, 24.9 ml) and indium (III) chloride (1.0 equiv. 0.041 mol, 9.09 g). The product was isolated (6.10 g, 50% yield) as a white solid which melted at 91° C. ¹H-NMR (THF-d₈, δ (ppm)): 1.16 (12H, d, 6.5 Hz), 3.57 (2H, spt, 6.5 Hz), 7.69 (1H, s). The TGA results for [(iPr)NBCH═CH═N(iPr)]In(III)Cl₂ is shown in FIG. 4, which shows single step evaporation with <5% residue remaining at 210° C. for [(iPr)N═CH═N(iPr)]In(III)Cl₂. For a comparison purpose, the vacuum TGA result for InCl₃ is also added. As shown, volatility of [(iPr)N═CH═N(iPr)]In(III)Cl₂ precursor increases relative to that of InCl₃. Depending on the identity of the solvent used for acquiring ¹H NMR spectra, the structure was observed as either the monomer ([(iPr)N═CH═N(iPr)]In(III)Cl₂) or dimer ([((iPr)N═C(H)═N(iPr))InCl]₂(μ—Cl)₂). The DSC results for [(iPr)N═CH═N(iPr)]In(III)Cl₂ is shown in FIG. 5. [(iPr)N═CH═N(iPr)]In(III)Cl₂ has a vapor pressure of 1 torr at 128° C. FIG. 6 is ¹H NMR of [(iPr)N═CH═N(iPr)]In(III)Cl₂ in THF-d₈.

Example 3: Synthesis of [(iPr)N═C(nBu)═N(iPr)]In(III)Cl₂

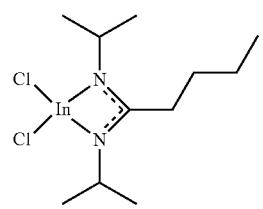

Figure 7:
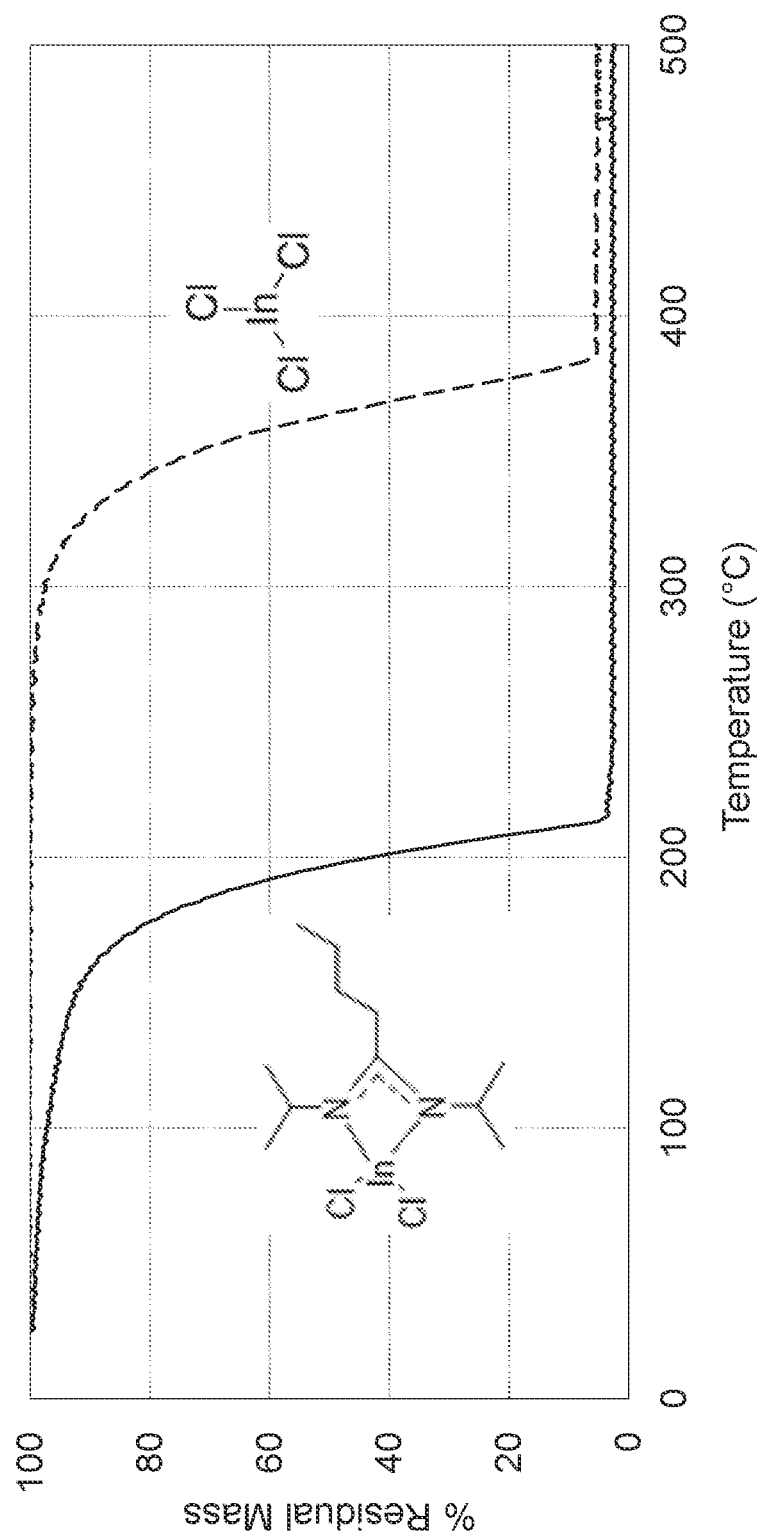
FIG. 7 is TGA results of [(iPr)N═C(nBu)═N(iPr)]In(III)Cl$_2$.
Figure 8:
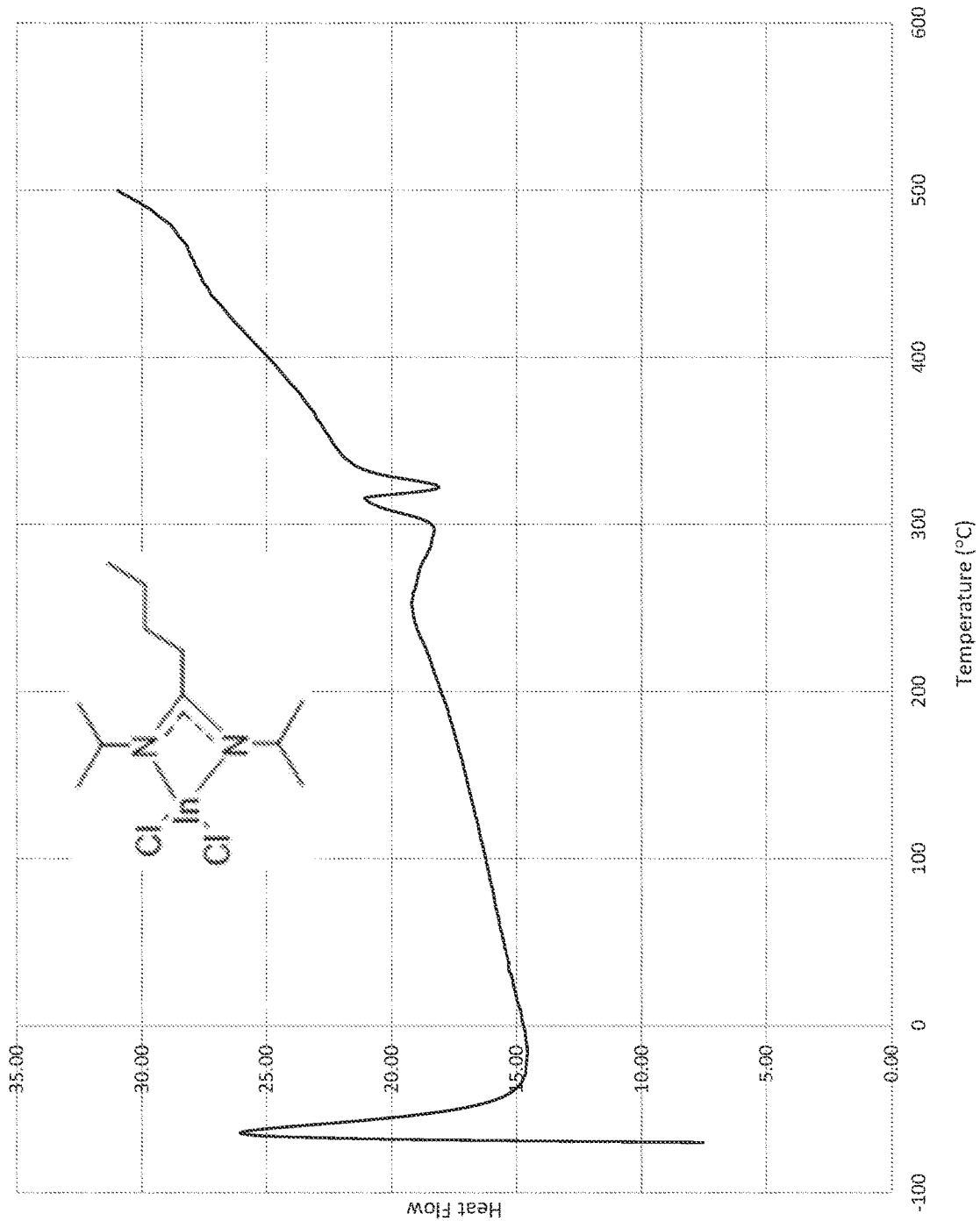
FIG. 8 is DSC results of [(iPr)N═C(nBu)═N(iPr)]In(III)Cl$_2$.
Figure 9:
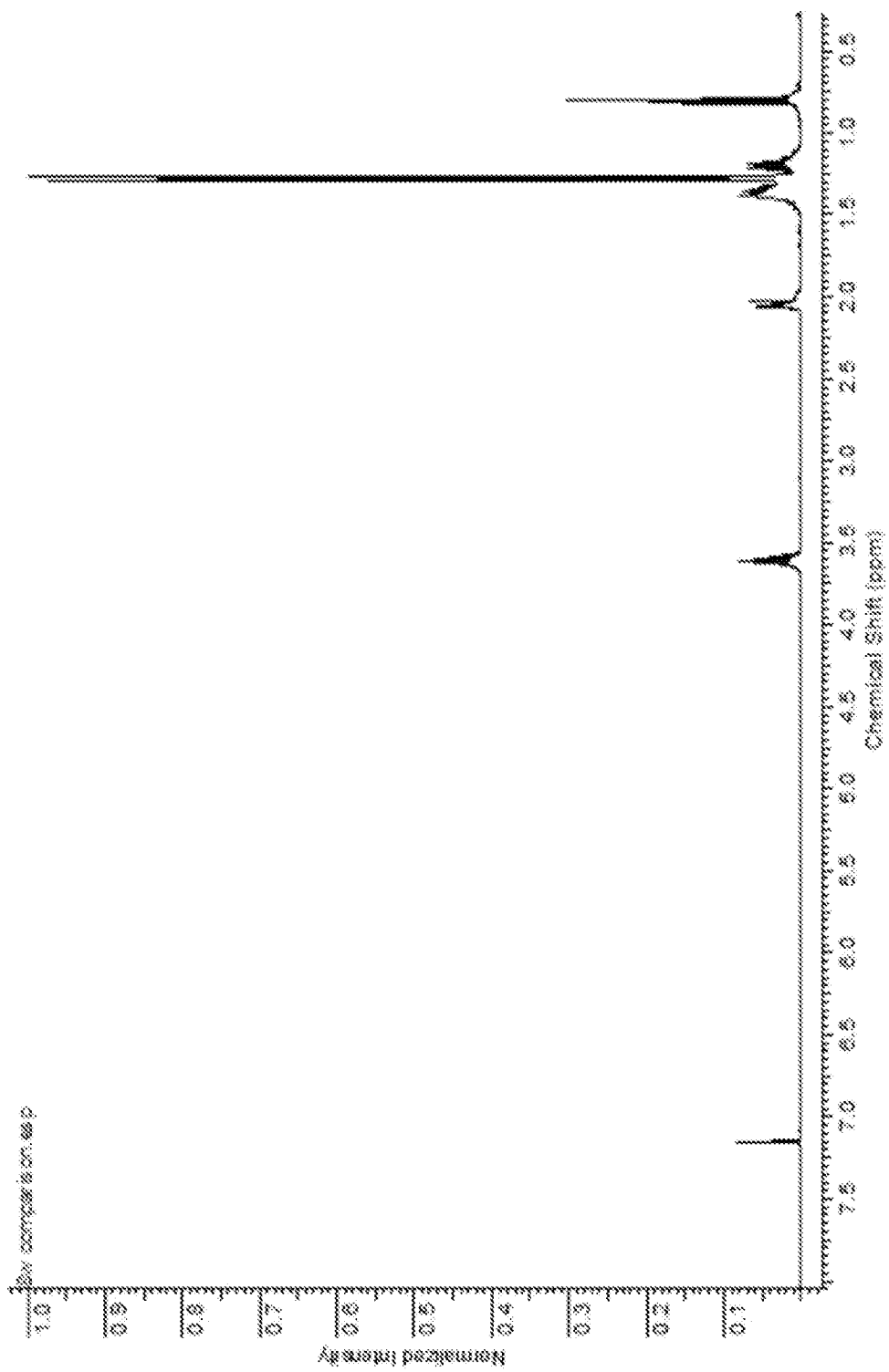
FIG. 9 is $^1$H NMR of [(iPr)N═C(nBu)═N(iPr)]In(III)Cl$_2$ in C$_6$D$_6$.

The same procedure was followed for Example 1. Reagents used were N,N'-diisopropylcarbodiimide (0.95 equiv, 0.046 mol, 5.75 g), n-butyllithium (0.97 equiv, 0.047 mol, 29.1 ml) and indium (III) chloride (1.0 equiv. 0.048 mol, 10.64 g). The precursor [(iPr)N═C(nBu)═N(iPr)]In(III)Cl₂ was isolated as a viscous liquid (12.91 g, 73% yield). ¹H-NMR (benzene-d₆, δ (ppm): 0.80 (3H, t, 7.3 Hz), 1.19 (2H, m), 1.27 (12H, d, 6.5 Hz), 1.33 (2H, m), 1.35 (2H, m), 2.05 (2H, m), 3.60 (2H, quint, 6.2 Hz). The TGA results for [(iPr)N═C(nBu)═N(iPr)]In(III)Cl₂ is shown in FIG. 7, which shows single step evaporation with <3% residue remaining at 250° C. for [(iPr)N═C(nBu)═N(iPr)]In(III)Cl₂. For a comparison purpose, the vacuum TGA result for InCl₃ is also added. As shown, volatility of [(iPr)N═C(nBu)═N(iPr)]In(III)Cl₂ precursor increases relative to that of InCl₃. The DSC results for [(iPr)N═C(nBu)═N(iPr)]In(III)Cl₂ is shown in FIG. 8. [(iPr)N═C(nBu)═N(iPr)]In(III)Cl₂ has a vapor pressure of 1 torr at 155° C. FIG. 9 is ¹H NMR of [(iPr)N═C(nBu)═N(iPr)]In(III)Cl₂ in C₆D₆.

Example 4: Synthesis of [(Et)N═C(nBu)═N(tBu)]In(III)Cl₂

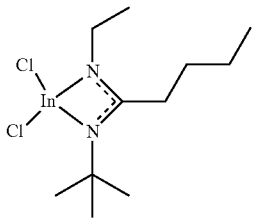

Figure 10:
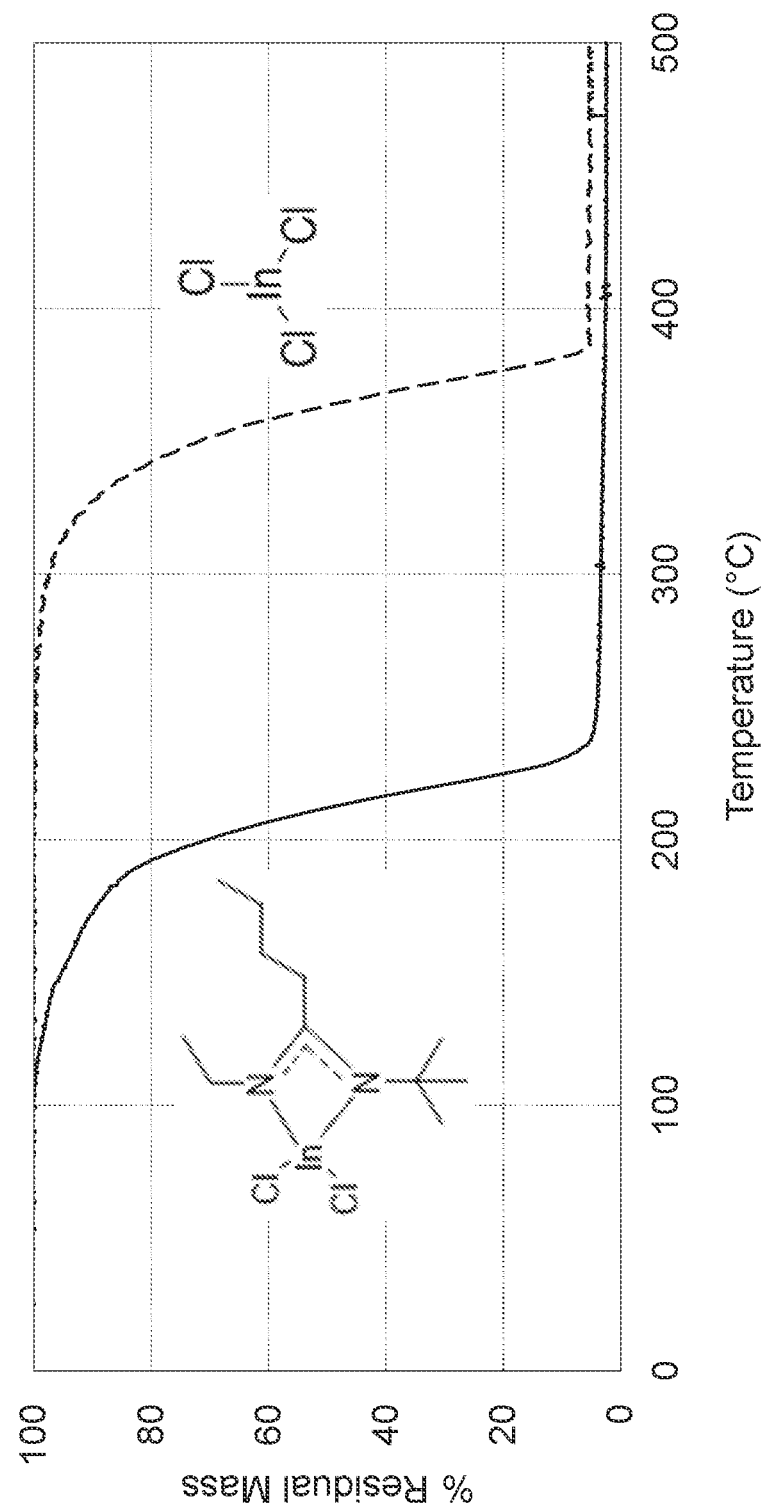
FIG. 10 is TGA results of [(Et)N═C(nBu)═N(tBu)]In(III)Cl$_2$.
Figure 11:
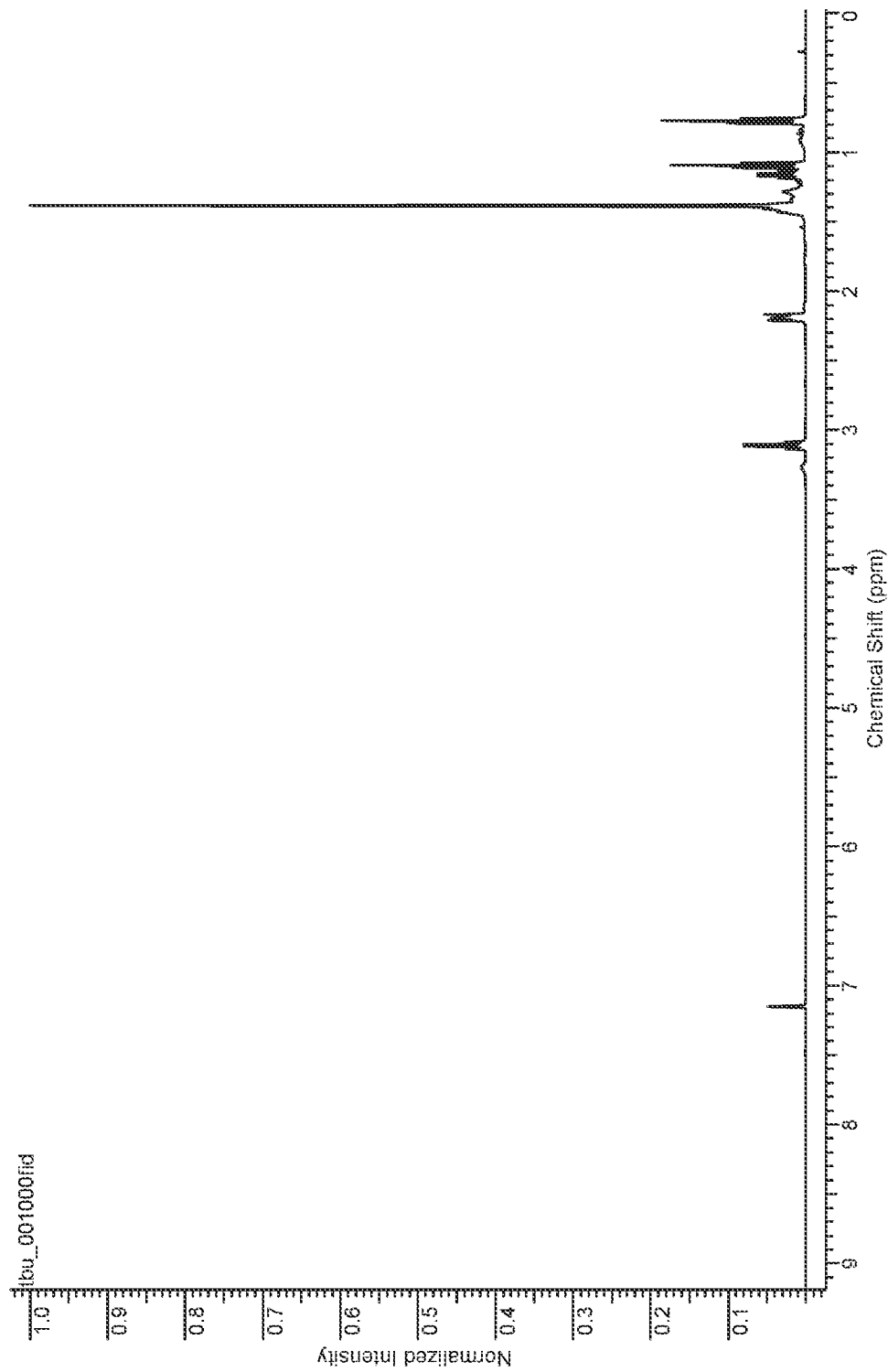
FIG. 11 is $^1$H NMR of [(Et)N═C(nBu)═N(tBu)]In(III)Cl$_2$ in C$_6$D$_6$.

The same procedure was followed for Example 1. Reagents used were 1-tert-butyl-3-ethylcarbodiimide (0.95 equiv, 0.048 mol, 5.99 g), n-butyllithium (0.97 equiv, 0.049 mol, 30.3 ml) and indium (III) chloride (1.0 equiv. 0.05 mol, 11.09 g). The precursor [(Et)N═C(nBu)═N(tBu)]In(III)Cl₂ was isolated as a viscous liquid (12.18 g, 66% yield). ¹H-NMR (benzene-d₆, δ (ppm): 0.77 (3H, t, 7.3 Hz), 1.10 (3H, t, 7.2 Hz), 1.16 (2H, m), 1.30 (2H, m), 1.38 (9H, s), 2.17 (2H, m), 3.11 (2H, q, 7.0 Hz). The TGA results for [(Et)N═C(nBu)═N(tBu)]In(III)Cl₂ is shown in FIG. 10, which shows single step evaporation with <8% residue remaining at 240° C. for [(Et)N═C(nBu)═N(tBu)]In(III)Cl₂. For a comparison purpose, the vacuum TGA result for InCl₃ is also added. As shown, volatility of [(Et)N═C(nBu)═N(tBu)]In(III)—Cl₂ precursor increases relative to that of InCl₃. FIG. 11 is ¹H NMR of [(Et)N═C(nBu)═N(tBu)]In(III)Cl₂ in C₆D₆.

Example 5: Synthesis of [(iPr)N═C(Me)═N(iPr)]In(III)Cl₂ Through Lithium Amidinate Route

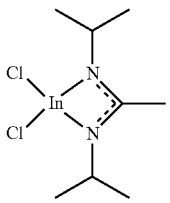

Figure 12:
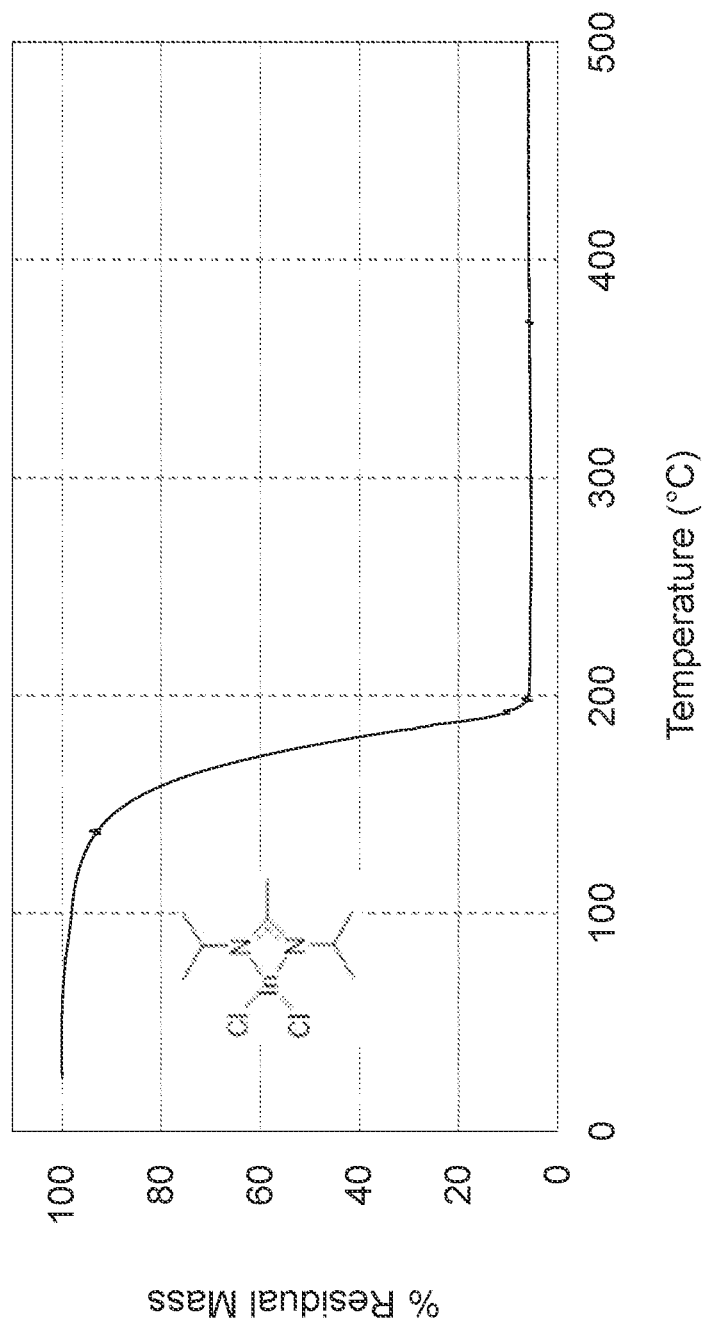
FIG. 12 is TGA results of [(iPr)N═C(Me)═N(iPr)]In(III)Cl$_2$.

The same procedure was followed for Example 1. Reagents used were diisopropylcarbodiimide (0.95 equiv, 0.14 mol, 22.7 mL) methyllithium (0.97 equiv, 0.15 mol, 90.9 ml) and indium (III) chloride (1.0 equiv. 0.15 mol, 33.3 g). The product was isolated (25.1 g, 51% yield) as a white solid which melted at 110° C. ¹H-NMR (benzene-d₆, δ (ppm): 1.20 (13H, d, 6.5 Hz), 1.41 (3H, s), 3.46 (2H, spt, 6.5 Hz). The TGA results for [(iPr)N═C(Me)═N(iPr)]In(III)Cl₂ is shown in FIG. 12, which shows single step evaporation with <5% residue remaining at 200° C. for [(iPr)N═C(Me)═N(iPr)]In(III)Cl₂. For a comparison purpose, the vacuum TGA result for InCl₃ is also added. As shown, volatility of [(iPr)N═C(Me)═N(iPr)]In(III)Cl₂ precursor increases relative to that of InCl₃.

Example 6: Synthesis of [(iPr)N═C(Me)═N(iPr)]In(III)Cl₂ Through Ligand Exchange Route

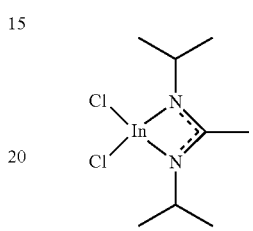

Figure 13:
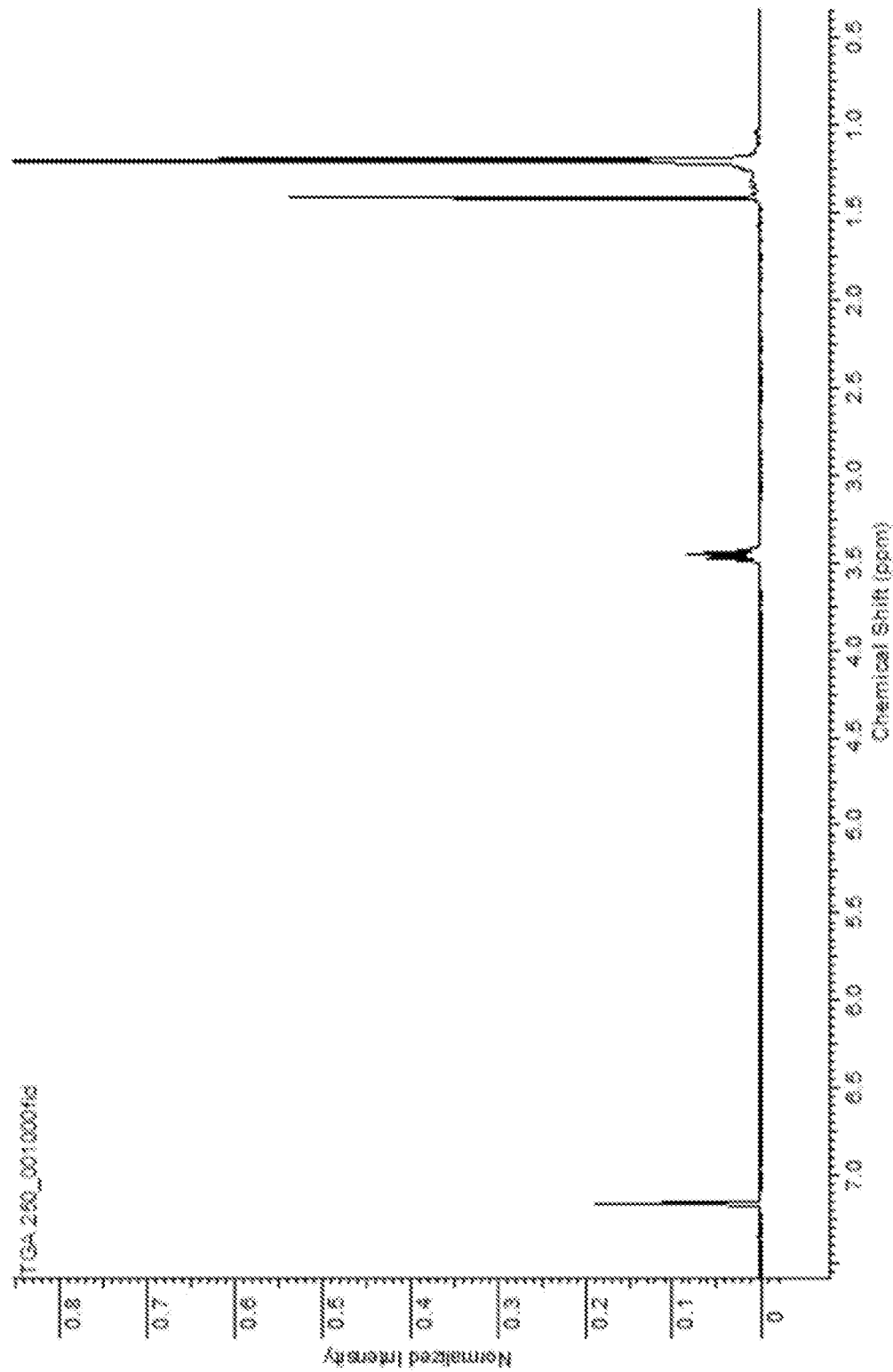
FIG. 13 is $^1$H NMR of [(iPr)N═C(Me)═N(iPr)]In(III)Cl$_2$ in C$_6$D$_6$.

In a Schlenk flask under nitrogen, N,N'-diisopropyl-N-(trimethylsilyl)acetimidamide (1.4 equiv, 0.31 mol, 66 grams) was dissolved in an ethereal solvent (500 mL), preferably tetrahydrofuran. In a separate Schlenk flask under nitrogen, indium (III) chloride (1.0 equiv, 0.22 mol, 48.8 grams) was dissolved in an ethereal solvent (250 mL), preferably tetrahydrofuran. With stirring, the, N,N'-diisopropyl-N-(trimethylsilyl)acetimidamide mixture was slowly added to the indium halide, and allowed to stir at room temperature for 12 hours. At which time the solvent was removed under reduced vacuum to isolate the crude product. A soxhlet extraction was performed with 800 mL of pentane to isolate the desired product from trace remaining indium (III) chloride. Upon removal of the solvent, [(iPr)N═C(Me)═N(iPr)]In(III)Cl₂ was isolated as a white solid (56.3 grams, 83% yield). Using the ligand exchange route greatly improved the yield of [(iPr)N═C(Me)═N(iPr)]In(III)Cl₂. FIG. 13 is ¹H NMR of [(iPr)N═C(Me)═N(iPr)]In(III)Cl₂ in C₆D₆.

Prophetic Example 1: Synthesis of [(Et)N═C(Me)═N(tBu)]₂InCl

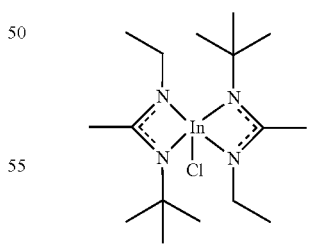

In a Schlenk flask under nitrogen fitted with an addition funnel, 1-tert-butyl-3-ethylcarbodiimide (2.0 equiv, 0.08 mol, 10.10 g) is dissolved in an ethereal solvent (120 mL), preferably diethyl ether, and cooled to −78° C. Methyllithium (2.0 equiv, 0.08 mol, 50 mL) 1.6 M in diethyl ether is added to the flask slowly. The mixture is allowed to stir for two hours and warmed to room temperature with stirring. In a separate Schleck flask a suspension of indium (III) chloride (1.0 equiv, 0.040 mol, 8.87 g) in an ethereal solvent (200 mL), preferably dimethoxyethane, is cooled to −78° C. The lithium solution is slowly added to the suspension, and the reaction is allowed to warm to room temperature and is stirred for 12 hours. At which time the solvent is removed under reduced vacuum followed by the addition of 250 mL of pentane. The reaction can be filtered through Celite. Following the removal of solvent [(Et)N═C(Me)═N(tBu)]$_2$InCl can be further purified by crystallization or sublimation for solid materials or distillation for liquid materials.

Prophetic Example 2: Synthesis of

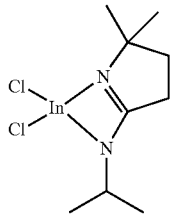

In a Schlenk flask under nitrogen fitted with an addition funnel, isopropyl-imino-2,2-dimethylpyrrolidine (1.0 equiv, 0.040 mol, 6.17 g) is dissolved in an ethereal solvent (120 mL), preferably diethyl ether, and cooled to −78° C. Methyllithium (1.0 equiv, 0.040 mol, 25 mL) 1.6 M in diethyl ether is added to the flask slowly. The mixture is allowed to stir for two hours and warmed to room temperature with stirring. In a separate Schleck flask a suspension of indium (III) chloride (1.0 equiv, 0.040 mol, 8.87 g) in an ethereal solvent (200 mL) is cooled to −78° C. The lithium solution is slowly added to the suspension, and the reaction is allowed to warm to room temperature and stirred for 12 hours. At which time the solvent is removed under reduced vacuum followed by the addition of 250 mL of pentane. The reaction is filtered through Celite. Following the removal of solvent, [((Me$_2$)C)N═C(CH$_2$CH$_2$)—N(ipr)]InCl$_2$ can be further purified by crystallization or sublimation for solid materials or distillation for liquid materials.

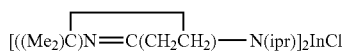

Prophetic Example 3: Synthesis of

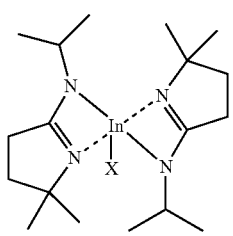

In a Schlenk flask under nitrogen fitted with an addition funnel, isopropyl-imino-2,2-dimethylpyrrolidine (2.0 equiv, 0.080 mol, 12.34 g) is dissolved in an ethereal solvent (120 mL), preferably diethyl ether, and cooled to −78° C. Methyllithium (2.0 equiv, 0.080 mol, 50 mL) 1.6 M in diethyl ether is added to the flask slowly. The mixture is allowed to stir for two hours and warmed to room temperature with stirring. In a separate Schleck flask a suspension of indium (III) chloride (1.0 equiv, 0.040 mol, 8.87 g) in an ethereal solvent (200 mL) is cooled to −78° C. The lithium solution is slowly added to the suspension, and the reaction is allowed to warm to room temperature and stirred for 12 hours. At which time the solvent is removed under reduced vacuum followed by the addition of 250 mL of pentane. The reaction is filtered through Celite. Following the removal of solvent, [((Me$_2$)C)N═C(CH$_2$CH$_2$)—N(ipr)]$_2$InCl can be further purified by crystallization or sublimation for solid materials or distillation for liquid materials.

Prophetic Example 4: Synthesis of [(Et$_2$)N—CH$_2$—CH$_2$—N(Et)]InCl$_2$

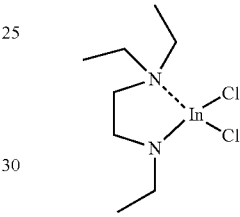

In a Schlenk flask under nitrogen fitted with an addition funnel, N,N,N'-triethylethylenediamine (1.0 equiv, 0.040 mol, 5.77 g) is dissolved in an ethereal solvent (120 mL), preferably diethyl ether, and cooled to −78° C. Methyllithium (1.0 equiv, 0.040 mol, 25 mL) 1.6 M in diethyl ether is added to the flask slowly. The mixture is allowed to stir for two hours and warmed to room temperature with stirring. In a separate Schleck flask a suspension of indium (III) chloride (1.0 equiv, 0.040 mol, 8.87 g) in an ethereal solvent (200 mL) is cooled to −78° C. The lithium solution is slowly added to the suspension, and the reaction is allowed to warm to room temperature and stirred for 12 hours. At which time the solvent is removed under reduced vacuum followed by the addition of 250 mL of pentane. The reaction is filtered through Celite. Following the removal of solvent, [(Et$_2$)N—CH$_2$—CH$_2$—N(Et)]InCl$_2$ can be further purified by crystallization or sublimation for solid materials or distillation for liquid materials.

Prophetic Example 6: Synthesis of [(Et$_2$)N—CH$_2$—CH$_2$—N(Et)]$_2$InCl

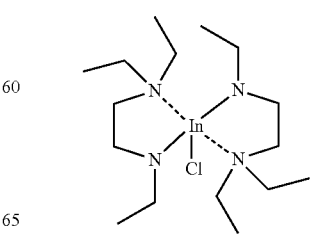

In a Schlenk flask under nitrogen fitted with an addition funnel, N,N,N'-triethylethylenediamine (1.0 equiv, 0.080 mol, 11.54 g) is dissolved in an ethereal solvent (120 mL), preferably diethyl ether, and cooled to −78° C. Methyllithium (1.0 equiv, 0.080 mol, 50 mL) 1.6 M in diethyl ether is added to the flask slowly. The mixture is allowed to stir for two hours and warmed to room temperature with stirring. In a separate Schleck flask a suspension of indium (III) chloride (1.0 equiv, 0.040 mol, 8.87 g) in an ethereal solvent (200 mL) is cooled to −78° C. The lithium solution is slowly added to the suspension, and the reaction is allowed to warm to room temperature and stirred for 12 hours. At which time the solvent is removed under reduced vacuum followed by the addition of 250 mL of pentane. The reaction is filtered through Celite. Following the removal of solvent, $[(Et_2)N-CH_2-CH_2-N(Et)]InCl_2$ can be further purified by crystallization or sublimation for solid materials or distillation for liquid materials.

Prophetic Example 6: ALD of an $In_2O_3$ Film Using Precursor $[(iPr)N=C(nBu)=N(iPr)]In(III)Cl_2$ $In_2O_3$ ALD was performed using alternating exposures of $[(iPr)N=C(nBu)=N(iPr)]In(III)Cl_2$ and $O_3$ in an ALD reactor. $N_2$ carrier gas is used to transport the vapor of $[(iPr)N=C(nBu)=N(iPr)]In(III)Cl_2$ into the ALD reactor. The ALD sequences are expressed the exposure for the precursor $[(iPr)N=C(nBu)=N(iPr)]In(III)Cl_2$, the purge following the precursor exposure, afterward, the exposure of the co-reactant $O_3$, and then the purge following the exposure to $O_3$. $In_2O_3$ ALD films may be deposited on 2 cm by 2 cm Si(100) and glass substrates. The deposition temperature may be 250° C. in 1 torr. SEM images are acquired of the resulting $In_2O_3$ film. An energy dispersive analysis of X-rays (EDAX) detector is used to acquire elemental analysis. AFM, XRD and ellipsometric measurements of the resulting $In_2O_3$ films deposited on Si(100) surfaces are performed. Other various characterization techniques such as atomic absorption (AA), MS-GC, NMR. FT-IR, neutron activation analysis (NAA), energy dispersive analysis by X-rays (EDAX). Rutherford back-scattering analysis (RBS), and X-ray analyses are used to help understand the fundamental mechanism of the resulting $In_2O_3$ film.

Prophetic Example 7: Thermal ALD of an InP Film Using Precursor $[(iPr)N=C(Me)=N(iPr)]In(III)Cl_2$ $[(iPr)N=C(Me)=N(iPr)]In(III)Cl_2$ and $P(SiMe_3)_3$ are used as the In and P sources, respectively. The film deposition occurs using $N_2$ as the carrier gas for precursor delivery. A purge step of sufficient duration occurs after each precursor is dosed into the thermal ALD reactor. The cycle is initiated by dosing the $[(iPr)N=C(Me)=N(iPr)]In(III)Cl_2$ precursor into the reactor. $P(SiMe_3)_3$ is then introduced into the reactor to close the cycle. By transporting the precursors to the substrate, the precursors are adsorbed on the substrate surface. The reactive species thus diffuse at the surface to preferential sites and react in a heterogeneous phase to give rise to the formation of the InP film. The deposition may require no catalyst and may be carried out on a variety of substrates, such as thin Si or oxide substrates. The substrate temperature is maintained at approximately 150° C. The resulting InP films can then undergo further processing, such as a thermal annealing step. The InP films are characterized by various techniques such as atomic absorption (AA), MS-GC, NMR, FT-IR, neutron activation analysis (NAA), energy dispersive analysis by X-rays (EDAX), Rutherford back-scattering analysis (RBS), and X-ray analyses, etc., which are used to help understand the fundamental mechanism of the ALD growth.

Prophetic Example 8: Thermal ALD of an InGaAs Film Using Precursor $[(iPr)NF=C(Me)=N(iPr)]In(III)Cl_2$ $[(iPr)N=C(Me)=N(iPr)]In(III)Cl_2$, $GaCl_3$ and $As(SiMe_3)_3$ are used as the In, Ga and As sources, respectively. The film deposition occurs using an ACBC-type supercycle in which $N_2$ is used as the carrier gas for precursor delivery. A purge step of sufficient duration occurs after each precursor is dosed into the thermal ALD reactor. The cycle is initiated by dosing the $[(iPr)N=C(Me)=N(iPr)]In(III)Cl_2$ precursor into the reactor. $As(SiMe_3)_3$ is introduced into the reactor. $GaCl_3$ is then dosed into the chamber. A final dose of $As(SiMe_3)_3$ closes the cycle. By transporting the precursors to the substrate, the precursors are adsorbed on the substrate surface. The reactive species thus diffuse at the surface to preferential sites and react in a heterogeneous phase to give rise to the formation of the InGaAs film. Such a cycle can be used to provide films with compositions of $In_{0.5}Ga_{0.5}As_1$. The steps of thermal ALD of InGaAs can also be adjusted to provide films of varying compositions. The deposition may require no catalyst and may be carried out on a variety of substrates, such as thin Si or oxide substrates. The substrate temperature is maintained at approximately 150° C. The resulting InGaAs films can then undergo further processing, such as a thermal annealing step. The InGaAs films are characterized by various techniques such as atomic absorption (AA), MS-GC, NMR, FT-IR, neutron activation analysis (NAA), energy dispersive analysis by X-rays (EDAX), Rutherford back-scattering analysis (RBS), and X-ray analyses, etc., which are used to help understand the fundamental mechanism of the ALD growth.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method for forming an indium(III)-containing film on a substrate, the method comprising the steps of:
    exposing the substrate to a vapor of a film forming composition that contains an indium(III)-containing precursor; and
    depositing at least part of the indium(III)-containing precursor onto the substrate to form the indium(III)-containing film on the substrate through a vapor deposition process,
    wherein the indium(III)-containing precursor is selected from

[((Me₂C)N=C(CH₂CH₂))—N(iPr)]InCl₂,

[((Me₂C)N=C(CH₂CH₂))—N(ipr)]₂InCl,

[(Et₂)N—CH₂—CH₂—N(Et)]InCl₂, or

[(Et₂)N—CH₂—CH₂—N(Et)]₂InCl.

2. The method of claim 1, wherein the vapor deposition process is an ALD or a CVD process.

3. The method of claim 1, further comprising the step of exposing the substrate to a co-reactant.

4. The method of claim 3, wherein the co-reactant is selected from $O_3$, $O_2$, $H_2O$, NO, $N_2O$, $NO_2$, $H_2O_2$, O radicals and combinations thereof.

5. The method of claim 3, wherein the co-reactant is selected from $NH_3$, NO, $N_2O$, hydrazines, $N_2$ plasma, $N_2/H_2$ plasma, $NH_3$ plasma, amines and combinations thereof.

6. The method of claim 1, wherein the indium(III)-containing film is an indium oxide film, or a binary, ternary and quaternary indium alloy film.

7. The method of claim 1, wherein the indium(III)-containing film is InGaAs, $In_xO_y$ (x=0.5 to 1.5, y=0.5 to 1.5), InSnO (ITO), InGaZnO (IGZO), InN, InP, InAs, InSb, $In_2S_3$, or $In(OH)_3$.

8. A method for forming an indium(III)-containing film on a substrate, the method comprising the steps of:
    forming a chemisorbed and/or physisorbed film of an indium(III)-containing precursor on the surface of the substrate, wherein the indium(III)-containing precursor is selected from

[((Me₂C)N=C(CH₂CH₂))—N(iPr)]InCl₂,

[((Me₂C)N=C(CH₂CH₂))—N(ipr)]₂InCl,

[(Et₂)N—CH₂—CH₂—N(Et)]InCl₂,

[(Et₂)N—CH₂—CH₂—N(Et)]₂InCl.

9. The method of claim 8, further comprising the step of chemically reacting the chemisorbed and/or physisorbed film comprising the indium(III)-containing precursor with a co-reactant.

10. The method of claim 9, wherein the co-reactant is selected from $O_3$, $O_2$, $H_2O$, NO, $N_2O$, $NO_2$, $H_2O_2$, O radicals and combinations thereof.

11. The method of claim 9, wherein the co-reactant is selected from $NH_3$, NO, $N_2O$, hydrazines, $N_2$ plasma, $N_2/H_2$ plasma, $NH_3$ plasma, amines and combinations thereof.

* * * * *